(12) United States Patent
Scholl et al.

(10) Patent No.: US 12,406,277 B2
(45) Date of Patent: Sep. 2, 2025

(54) BIOMETRIC SENSOR SYSTEM AND METHOD FOR MONITORING A DRIVER OF A VEHICLE

(71) Applicant: MASTERCARD INTERNATIONAL INCORPORATED, Purchase, NY (US)

(72) Inventors: Christopher T. Scholl, Manchester, MO (US); David Vorhies, Saint Charles, MO (US); Regan E. Harmon, O'Fallon, MO (US); Shawn Mehrhoff, Saint Ann, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/627,290

(22) Filed: Apr. 4, 2024

(65) Prior Publication Data
US 2024/0249306 A1 Jul. 25, 2024

Related U.S. Application Data

(63) Continuation of application No. 16/122,635, filed on Sep. 5, 2018, now Pat. No. 11,978,074.

(51) Int. Cl.
*G06Q 30/0207* (2023.01)
*B60W 40/09* (2012.01)
(Continued)

(52) U.S. Cl.
CPC ......... *G06Q 30/0207* (2013.01); *B60W 40/09* (2013.01); *G06F 11/3438* (2013.01);
(Continued)

(58) Field of Classification Search
CPC ................................................. G06Q 30/0207
See application file for complete search history.

(56) References Cited

U.S. PATENT DOCUMENTS 7,071,842 B1 7/2006 Brady, Jr.
8,510,200 B2 8/2013 Pearlman et al.
(Continued)

FOREIGN PATENT DOCUMENTS

| DE | 102012214464 A1 * | 2/2014 | .......... G09B 19/167 |
| KR | 20170058161 A | 5/2017 | |
| WO | 2018023409 A1 | 2/2018 | |

OTHER PUBLICATIONS

Corey Catten, "Available Technologies to Prevent Cell Phone Use while Driving", SPE/APPEA International Conference on Health, Safety, and Environment in Oil and Gas Exploration and Production, Sep. 11, 2012, 2 pages.
(Continued)

*Primary Examiner* — Ilana L Spar
*Assistant Examiner* — Melinda Gieringer
(74) *Attorney, Agent, or Firm* — Armstrong Teasdale LLP

(57) ABSTRACT

A driver monitoring (DM) computing device for monitoring driving behavior of a driver in real-time is provided. The DM computing device detects a user computer device associated with a driver inside the vehicle. The DM computing device collects state data of the user computer device. The state data includes data as to a state of the user computer device during a currently occurring trip. The DM computing device collects vehicle operation data of the vehicle while the driver and the user computer device are inside the vehicle. The DM computing device compares the collected vehicle operation data and the state data of the user computer device to determine whether the user computer device was activated during the currently occurring trip. The DM computing device causes a driving reward to be applied to an account associated with the driver for inactivity of the user computer device during the currently occurring trip.

20 Claims, 9 Drawing Sheets

(51) Int. Cl.
*G06F 11/34* (2006.01)
*G06Q 40/08* (2012.01)
*G06Q 50/40* (2024.01)
*G06V 20/59* (2022.01)
*G06V 40/12* (2022.01)
*G07C 5/00* (2006.01)

(52) U.S. Cl.
CPC ............ *G06Q 40/08* (2013.01); *G06Q 50/40* (2024.01); *G06V 20/597* (2022.01); *G06V 40/1365* (2022.01); *G07C 5/008* (2013.01)

(56) References Cited

U.S. PATENT DOCUMENTS

| | | | |
|---|---|---|---|
| 8,686,844 B1 | 4/2014 | Wine | |
| 8,924,240 B2 | 12/2014 | Depura et al. | |
| 9,055,407 B1 | 6/2015 | Riemer et al. | |
| 9,141,582 B1 | 9/2015 | Brinkmann et al. | |
| 9,418,491 B2* | 8/2016 | Phillips | G07C 5/02 |
| 9,596,357 B1 | 3/2017 | Ruperto | |
| 9,672,568 B1 | 6/2017 | Slusar et al. | |
| 9,754,425 B1 | 9/2017 | Iqbal et al. | |
| 9,820,108 B1 | 11/2017 | Inciong et al. | |
| 9,858,832 B1 | 1/2018 | Hsu-Hoffman et al. | |
| 10,026,243 B1 | 7/2018 | Hsu-Hoffman et al. | |
| 10,115,173 B1* | 10/2018 | Manzella | G06Q 50/26 |
| 10,430,883 B1 | 10/2019 | Bischoff et al. | |
| 10,445,758 B1 | 10/2019 | Bryer et al. | |
| 10,565,593 B1 | 2/2020 | Aabram et al. | |
| 10,699,289 B1 | 6/2020 | Dalton et al. | |
| 10,832,327 B1* | 11/2020 | Potter | G06Q 40/08 |
| 10,990,837 B1* | 4/2021 | Simoncini | B60W 40/09 |
| 11,151,888 B1 | 10/2021 | Fillinger et al. | |
| 2006/0195394 A1 | 8/2006 | Jung et al. | |
| 2007/0156530 A1 | 7/2007 | Schmitt et al. | |
| 2008/0238690 A1* | 10/2008 | Plant | G07C 9/27 340/573.1 |
| 2010/0030582 A1 | 2/2010 | Rippel et al. | |
| 2010/0082444 A1 | 4/2010 | Lin et al. | |
| 2010/0106585 A1 | 4/2010 | Etheredge et al. | |
| 2010/0210254 A1 | 8/2010 | Kelly et al. | |
| 2010/0280956 A1 | 11/2010 | Chutorash et al. | |
| 2011/0009107 A1 | 1/2011 | Guba et al. | |
| 2011/0059731 A1 | 3/2011 | Schivley | |
| 2011/0093161 A1 | 4/2011 | Zhou et al. | |
| 2011/0196571 A1 | 8/2011 | Foladare et al. | |
| 2011/0246284 A1 | 10/2011 | Chaikin et al. | |
| 2012/0071151 A1 | 3/2012 | Abramson et al. | |
| 2012/0089442 A1 | 4/2012 | Olsson et al. | |
| 2012/0176232 A1 | 7/2012 | Bantz et al. | |
| 2012/0185282 A1 | 7/2012 | Gore et al. | |
| 2013/0006675 A1 | 1/2013 | Bowne et al. | |
| 2013/0046510 A1 | 2/2013 | Bowne et al. | |
| 2013/0164715 A1 | 6/2013 | Hunt et al. | |
| 2013/0232029 A1 | 9/2013 | Rovik et al. | |
| 2014/0051041 A1* | 2/2014 | Stefan | G09B 19/167 434/65 |
| 2014/0081404 A1 | 3/2014 | Jacofsky et al. | |
| 2014/0095305 A1 | 4/2014 | Armitage et al. | |
| 2014/0108198 A1 | 4/2014 | Jariyasunant et al. | |
| 2014/0113619 A1 | 4/2014 | Tibbitts et al. | |
| 2014/0195272 A1 | 7/2014 | Sadiq et al. | |
| 2014/0226010 A1 | 8/2014 | Molin et al. | |
| 2014/0322676 A1 | 10/2014 | Raman | |
| 2015/0019873 A1 | 1/2015 | Hagemann | |
| 2015/0081404 A1 | 3/2015 | Basir | |
| 2015/0100447 A1 | 4/2015 | Bohbot | |
| 2015/0195399 A1 | 7/2015 | Way et al. | |
| 2015/0213555 A1 | 7/2015 | Barfield, Jr. et al. | |
| 2015/0220958 A1 | 8/2015 | Tietzen et al. | |
| 2015/0294422 A1 | 10/2015 | Carver et al. | |
| 2016/0133117 A1 | 5/2016 | Geller et al. | |
| 2017/0011398 A1 | 1/2017 | Narasimhan | |
| 2017/0031080 A1 | 2/2017 | Speer et al. | |
| 2017/0041737 A1 | 2/2017 | Fischer | |
| 2017/0061461 A1 | 3/2017 | Jajara | |
| 2017/0076396 A1* | 3/2017 | Sudak | G07C 5/085 |
| 2017/0184411 A1 | 6/2017 | Glasgow et al. | |
| 2017/0300975 A1 | 10/2017 | Lannace et al. | |
| 2017/0305434 A1* | 10/2017 | Ratnasingam | G05D 1/0088 |
| 2017/0310804 A1 | 10/2017 | Rhyne | |
| 2017/0310816 A1 | 10/2017 | Rhyne | |
| 2017/0323244 A1 | 11/2017 | Rani et al. | |
| 2017/0349182 A1 | 12/2017 | Cordova et al. | |
| 2018/0025554 A1 | 1/2018 | Gibson et al. | |
| 2018/0070291 A1 | 3/2018 | Breaux et al. | |
| 2020/0074326 A1 | 3/2020 | Balakrishnan et al. | |
| 2020/0074491 A1 | 3/2020 | Scholl et al. | |
| 2020/0074492 A1 | 3/2020 | Scholl et al. | |
| 2021/0097314 A1* | 4/2021 | Scanlon | G06V 20/584 |
| 2021/0142419 A1 | 5/2021 | Davis et al. | |
| 2021/0272210 A1 | 9/2021 | Dahl | |
| 2021/0398220 A1 | 12/2021 | Hayward et al. | |
| 2024/0212520 A1* | 6/2024 | Wrather | G07C 5/04 |

OTHER PUBLICATIONS

Guinn, T., "Phone app gives people discounts for not texting while driving", Published Apr. 12, 2017, Web Page retrieved from: https://www.cbs7.com/content/news/Phone-app-gives-people-discounts-for-not-texting-while-driving-419265184.html, 2 pages.

Liberty Mutual Insurance, RightTrack, "How RightTrack Works", Web Page retrieved from: <https://www.libertymutual.com/righttrack>, 2014, 2 pages.

* cited by examiner

BIOMETRIC SENSOR SYSTEM AND METHOD FOR MONITORING A DRIVER OF A VEHICLE

CROSS-REFERENCE TO RELATED APPLICATIONS

This application is a continuation-in-part of and claims priority to U.S. patent application Ser. No. 16/122,635, filed Sep. 5, 2018, and entitled "DRIVER MONITORING SYSTEM AND METHOD," the contents and disclosures of which are hereby incorporated by reference in their entirety.

BACKGROUND

This disclosure relates generally to driver monitoring systems and, more specifically, to network-based systems and methods for monitoring a driver's driving behavior in real-time.

Many vehicle accidents occur due to drivers being distracted by their phones while driving. Although drivers may know the risks associated with phone use while driving (e.g., causing a vehicle accident), many drivers continue to talk on the phone, send text messages, and/or browse applications on their phone while driving. Vehicle accidents can be costly, time consuming, and in serious cases, fatal. Although many states ban certain types of phone use while driving (e.g., texting and/or using a handheld phone), phone use in its entirety is not yet prohibited. Thus, drivers, especially young drivers, are more prone to browse through their phones (e.g., to check messages, go on social media, and/or take and upload photos) while they are on the road. Although some vehicle monitoring systems are known, they are susceptible to providing delayed and/or inaccurate data in regards to a driver's driving behavior. Such known vehicle monitoring systems do not reward and/or penalize a bank account and/or a payment card account associated with the driver based on the driver's monitored driving behavior. Thus, there exists a need for a real-time driver monitoring system that can provide accurate data as to a driver's driving behavior, and provide rewards and/or penalties to incentivize safe driving practices.

Additionally, new drivers generally must undergo training and testing before being granted driving credentials, such as a driver's license. While vehicle monitoring systems may generate data relevant to determining whether a driver has qualified for certain driving credentials, such known vehicle monitoring systems generally are not capable of making such determinations. Further, once driving credentials are granted to a new driver, there is no way to control access to these credentials, for example, based on an ongoing analysis of the driver's driving. Thus, there exists a need for a real-time driver monitoring system that can provide accurate data as to a driver's driving behavior, and control access to driving credentials based on this data.

BRIEF DESCRIPTION OF THE DISCLOSURE

In one aspect, a DM computing device for monitoring driving behavior is provided. The DM computing device may include a processor in communication with a memory and a vehicle. The processor may be configured to store, in a database, baseline biometric information for a plurality of registered drivers. The processor may be further configured to collect biometric data generated by one or more biometric sensors of the vehicle. The processor may be further configured to compare the collected biometric data to the baseline biometric information to identify a first driver of the plurality of registered drivers that is present in a vehicle. The processor may be further configured to collect vehicle operation data of the vehicle while the first driver is in the vehicle. The processor may be further configured to store the collected vehicle operation data in association with the first driver in the database. The processor may be further configured to generate, by applying an artificial intelligence model to the collected vehicle operation data stored in association with the first driver, at least one driver assessment value. The processor may be further configured to determine the first driver qualifies for a driving credential by comparing the at least one driver assessment value to at least one threshold. The processor may be further configured ton in response to the determination, provide access to a digital document within a virtual wallet application executed by a user device associated with the first driver, the digital document associated with the driving credential.

In another aspect, a computer-implemented method for monitoring driving behavior is provided. The computer-implemented method may be performed by a DM computing device including a processor in communication with a memory and a vehicle. The computer-implemented method may include storing, in a database, baseline biometric information for a plurality of registered drivers. The computer-implemented method may further include collecting biometric data generated by one or more biometric sensors of the vehicle. The computer-implemented method may further include comparing the collected biometric data to the baseline biometric information to identify a first driver of the plurality of registered drivers that is present in a vehicle. The computer-implemented method may further include collecting vehicle operation data of the vehicle while the first driver is in the vehicle. The computer-implemented method may further include storing the collected vehicle operation data in association with the first driver in the database. The computer-implemented method may further include generating, by applying an artificial intelligence model to the collected vehicle operation data stored in association with the first driver, at least one driver assessment value. The computer-implemented method may further include determining the first driver qualifies for a driving credential by comparing the at least one driver assessment value to at least one threshold. The computer-implemented method may further include in response to the determination, providing access to a digital document within a virtual wallet application executed by a user device associated with the first driver, the digital document associated with the driving credential.

In yet another aspect, at least one non-transitory computer-readable media having computer-executable instructions embodied thereon is provided. When executed by a DM computing device including at least one processor in communication with a memory and a vehicle, the computer-executable instructions may cause the at least one processor to store, in a database, baseline biometric information for a plurality of registered drivers. The computer-executable instructions may further cause the at least one processor to collect biometric data generated by one or more biometric sensors of the vehicle. The computer-executable instructions may further cause the at least one processor to compare the collected biometric data to the baseline biometric information to identify a first driver of the plurality of registered drivers that is present in a vehicle. The computer-executable instructions may further cause the at least one processor to collect vehicle operation data of the vehicle while the first driver is in the vehicle. The computer-executable instructions may further cause the at least one processor to store the collected vehicle operation data in association with the first driver in the database. The computer-executable instructions may further cause the at least one processor to generate, by applying an artificial intelligence model to the collected vehicle operation data stored in association with the first driver, at least one driver assessment value. The computer-executable instructions may further cause the at least one processor to determine the first driver qualifies for a driving credential by comparing the at least one driver assessment value to at least one threshold. The computer-executable instructions may further cause the at least one processor to, in response to the determination, provide access to a digital document within a virtual wallet application executed by a user device associated with the first driver, the digital document associated with the driving credential.

In yet another aspect, a driver monitoring (DM) computing device includes a processor and a memory in communication with the processor. The processor is programmed to detect a user computer device associated with a driver inside the vehicle. The processor is further programmed to collect state data of the user computer device. The state data includes data as to a state of the user computer device during a currently occurring trip. The state is at least one of an inactive state and an active state. The processor is further programmed to collect vehicle operation data of the vehicle while the driver and the user computer device are inside the vehicle, the vehicle operation data including vehicle telematics data. The processor is also programmed to compare the collected vehicle operation data and the collected state data of the user computer device to determine whether the user computer device was activated during the currently occurring trip. The processor is further programmed to cause a driving reward to be applied to an account associated with the driver for inactivity of the user computer device during the currently occurring trip, the inactivity being based on the inactive state.

In yet another aspect, a computer-implemented method for monitoring driving behavior of a driver in real-time may be provided. The method may be implemented using a driver monitoring (DM) computing device. The DM computing device may include a processor in communication with a memory device. The method includes detecting a user computer device associated with the driver inside the vehicle, wherein the user computer device is in an inactive state. The method further includes collecting state data of the user computer device, the state data including data as to a state of the user computer device during a currently occurring trip. The state is at least one of an inactive state and an active state. The method also includes collecting vehicle operation data of the vehicle while the driver and the user computer device are inside the vehicle. The vehicle operation data includes vehicle telematics data. The method further includes comparing the collected vehicle operation data and the collected state data of the user computer device to determine whether the user computer device was activated during the currently occurring trip. The method also includes causing a driving reward to be applied to an account associated with the driver for inactivity of the user computer device during the currently occurring trip, the inactivity being based on the inactive state.

In yet another aspect, a non-transitory computer-readable storage media having computer-executable instructions embodied thereon is provided. When executed by a driver monitoring (DM) computing device including a processor coupled to a memory, the computer-executable instructions cause the DM computing device to detect a user computer device associated with a driver inside the vehicle. The computer-executable instructions further cause the DM computing device to collect state data of the user computer device. The state data includes data as to a state of the user computer device during a currently occurring trip. The state being at least one of an inactive state and an active state. The computer-executable instructions further cause the DM computing device to collect vehicle operation data of the vehicle while the driver and the user computer device are inside the vehicle. The vehicle operation data includes vehicle telematics data. The computer-executable instructions further cause the DM computing device to compare the collected vehicle operation data and the collected state data of the user computer device to determine whether the user computer device was activated during the currently occurring trip. The computer-executable instructions further cause the DM computing device to cause a driving reward to be applied to an account associated with the driver for inactivity of the user computer device during the currently occurring trip, the inactivity being based on the inactive state.

BRIEF DESCRIPTION OF THE DRAWINGS

FIGS. 1-8B show example embodiments of the methods and systems described herein.

FIG. 1 illustrates a schematic diagram of an example vehicle having a driver monitoring (DM) computing device in accordance with the present disclosure.

FIG. 2 is a simplified block diagram of an example driver monitoring (DM) computer system as shown in FIG. 1 for implementing the processes shown in FIGS. 4, 8A, and 8B, in accordance with the present disclosure.

FIG. 3 illustrates an example use case for monitoring a driver's driving behavior using the DM computing device shown in FIG. 1, in accordance with the present disclosure.

FIG. 4 illustrates a flow chart of an example process for monitoring driving behavior of a driver using the DM computing device shown in FIG. 1, in accordance with the present disclosure.

FIG. 5 illustrates an example configuration of a user computer device for use in the system shown in FIG. 2.

FIG. 6 illustrates an example configuration of a server computer device for use in the system shown in FIG. 2.

FIG. 7 illustrates a diagram of components of one or more example computing devices that may be used in the computing system shown in FIG. 2.

FIG. 8B is a continuation of the flow chart illustrated in FIG. 8A.

Figure 1:
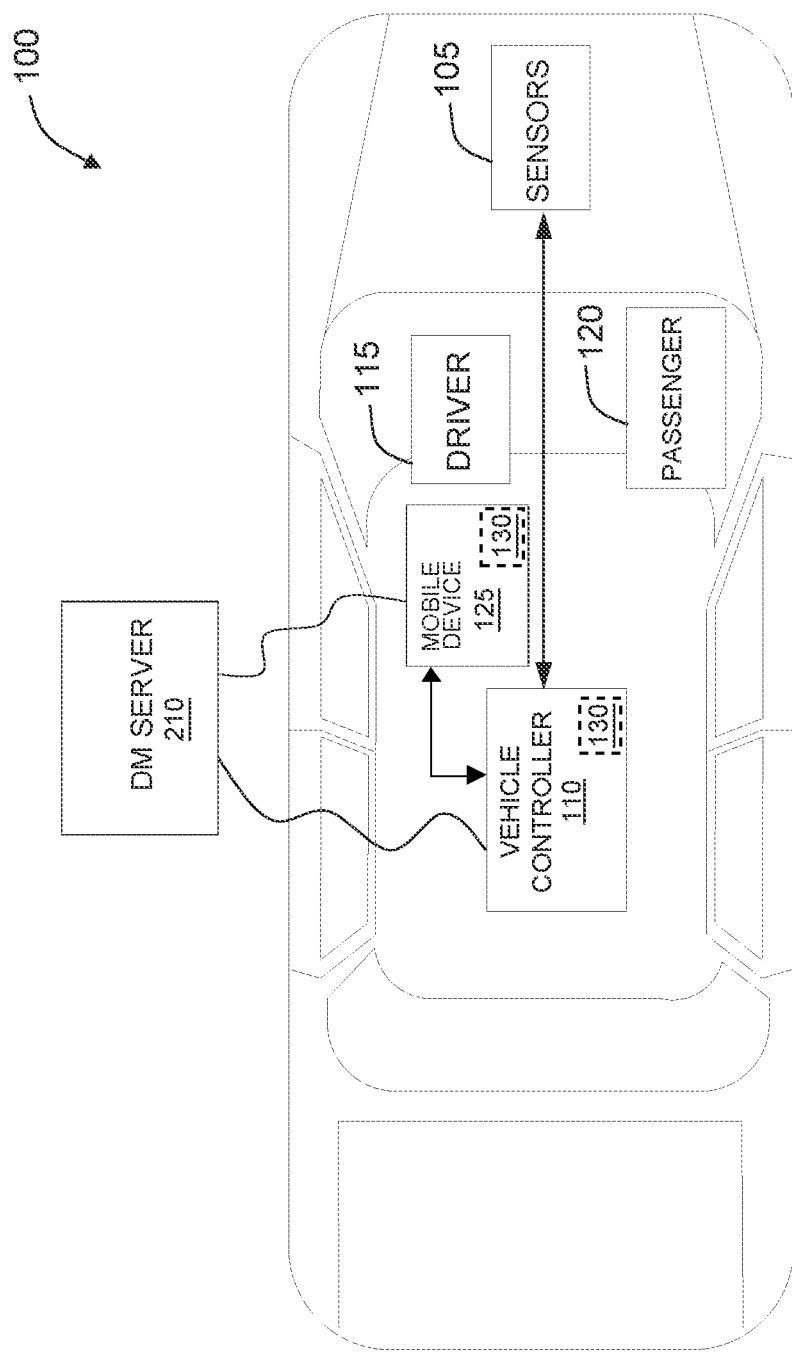

Like numbers in the Figures indicate the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

Systems and methods according to this disclosure are directed to monitoring real-time driving behavior, and more specifically, to detect usage of a user computer device (e.g., mobile device) by a driver during a driving event or trip (e.g., whenever a driver is driving a vehicle). In the example embodiment, a driver monitoring (DM) computing device (e.g., a DM server) is in communication with a vehicle controller and a user computer device (e.g., a mobile device) associated with a driver. As used herein, the term "vehicle controller" refers generally to a vehicle's electronic control unit (ECU) that controls one or more electrical systems and/or subsystems of a vehicle. The vehicle controller is in communication with the vehicle's sensors to monitor all aspects of the vehicle's engine operation (e.g., measuring and adjusting electronic valve control, speed, engine temperature, ignition timing, vehicle emissions control). The vehicle controller collects on-board diagnostics data as to the status of the vehicle's engine and various vehicle systems. The vehicle controller may also collect vehicle operation data including telematics data from the vehicle's sensors and/or various systems, such as an in-car entertainment (ICE) system or an in-vehicle infotainment (IVI) system that manages audio content, navigation, traffic conditions, weather, entertainment (e.g., movies games, radio), phone calls, and/or text messages. In the example embodiment, the DM computing device is a backend remote server (e.g., DM server) that is configured to receive data associated with the vehicle and the driver from the vehicle controller and/or the user computer device. A DM module on the user computer device and/or the vehicle controller enables the vehicle controller and/or the user computer device to communicate with the DM computing device. The DM module is remote from the DM computing device. In the example embodiment, the DM module is a software application on the user computer device. In some embodiments, the remote DM module is a plug-in to the vehicle controller. In other embodiments, the remote DM module is a separate device that is embedded in the vehicle. In other words, in the example embodiment, telematics data can be captured by the vehicle controller and/or the user computer device, and transmitted to the DM computing device via the remote DM module.

In the example embodiment, the vehicle may possess autonomous or semi-autonomous technology or functionality to enable biometric identification. The DM computing device receives biometric data from a user via a biometric input device associated with the vehicle. As used herein, the term "biometric data" refers generally to the field of biometrics or biometric identification/authentication, in which characteristics or traits of humans are captured and analyzed, often for distinguishing one individual from another using a uniqueness of the characteristics or traits captured. Some examples of biometric data include fingerprints, DNA, facial images, retinal images, and voiceprints. Biometric data may be collected by sensors, such as biometric sensors (e.g., biometric input devices) on the vehicle. Biometric sensors may include any sensor configured to receive a biological signal uniquely identifying an individual, such as, but not limited to, retinal scanners, fingerprint scanners, facial recognition devices, voice input devices, and weight scales. In the example embodiment, the vehicle may have one or more biometric sensors inside the vehicle to facilitate the sampling of biometric data from users of the vehicle. Biometric input devices may include, but are not limited, to fingerprint scanners on a vehicle component near the driver, such as the dashboard, the console, or the steering wheel. In some embodiments, the biometric input device is a biometric steering wheel that continuously feeds biometric data of a user (e.g., a driver) to the DM computing device throughout an active trip (e.g., a currently occurring trip). In another embodiment, the biometric input device is a camera that monitors a driver of the vehicle. In other embodiments, the biometric input device only receives biometric data from the user prior to the initiation of a trip.

In the example embodiment, the DM computing device subsequently compares received biometric data (e.g., sample data) from the user within the vehicle to a baseline biometric data stored in the memory. As used herein, "baseline biometric data" refers to reference data of authorized drivers of the vehicle to which sample data received from users of the vehicle can be compared. Authorized drivers of the vehicle may include those listed as a named insured and/or an authorized driver under an automobile insurance policy for vehicle. In the example embodiment, authorized drivers have previously provided biometric data, such as fingerprints, facial scans, and/or retinal scans to the DM computing device, and the provided biometric data is used as baseline biometric data. In some embodiments, authorized users may have previously provided baseline biometric data to an insurance provider of the automobile insurance policy associated with the vehicle. In these embodiments, the DM computing device may be in communication with the insurance provider via insurance network to access the baseline biometric data.

In the example embodiment, the DM computing device determines, from the comparison, that the current vehicle user is an authorized driver. If the received sample data matches the stored baseline biometric data, the DM computing device recognizes the vehicle user as an authorized driver and associates the active trip with the driver. If the DM computing device cannot recognize the vehicle user as an authorized driver, the DM computing device may prompt the vehicle user to provide a different type of sample data and/or to try again. If the vehicle user is not an authorized driver, the DM computing device may not associate the active trip with the vehicle user. In the example embodiment, the DM computing device detects a user computer device, such as a mobile device associated with the driver inside the vehicle. The DM computing device may communicate with the user computer device through the DM module stored on the vehicle or on the user computer device, and, for example, via the Internet, Bluetooth®, or any other wired or wireless connection (e.g., Near Field Communication) over one or more radio links or wireless communication channels. For example, the user computer device may automatically pair with a vehicle system (e.g., vehicle controller) via Bluetooth® and the DM computing device may communicate with the vehicle controller to identify the user computer device. In some embodiments, upon detecting the user computer device, the DM computing device causes the user computer device to automatically activate (e.g., launch, open) an application (e.g., the DM module) on the user computer device. The application detects a state (e.g., inactive and active) of the user computer device. In some embodiments, the application automatically switches the user computer device from an active state to an inactive state before the trip.

In the example embodiment, the DM computing device communicates with the user computer device to monitor a state of the user computer device during an active trip. The DM computing device monitors and/or detects whether the user computer device is in an active state or an inactive state by using GPS, cellular triangulation, and biometrics data of the driver. As used herein, "inactive state" refers to a locked mode where the screen of the user computer device is locked. In some embodiments, applications may be running in the background, such as location services and/or the activated application, while the user computer device is in an inactive state. In locked mode (e.g., inactive state), the user computer device may be awake but displaying minimum information (e.g., time and date on a locked screen or home screen). When awake, the user computer device displays the locked screen or home screen, and receives incoming communications. To switch from the inactive state to an active state, the driver needs to actively swipe the screen, provide a physical unlock gesture (e.g., moving and/or shaking the mobile device), and/or provide identification information (e.g., passcode, unlock pattern, and/or biometric data) to access the applications and contents of the user computer device. In some embodiments, the inactive state may also include a child mode and/or a hands-free mode. As used herein, "child mode" refers to a setting offered by the user computer device that restricts usage to kid friendly, parent-approved applications. Thus, the DM computing device may recognize that the driver's user computer device is inactive by detecting the setting (e.g., do not disturb mode, child mode, driving mode) of the user computer device. In one example, the DM computing device may determine that someone is playing a game on the driver's user computer device. In this example, the DM computing device may determine that the user computer device is in an inactive state for the driver's trip because the DM computing device concurrently detects both of the driver's hands on a biometric steering wheel.

"Usage data" as referred to herein includes information as to the inactive state and the active state during a trip. For example, usage data includes a time and/or a distance the driver's user computer device spends in each state during the active trip. In another example, usage data provides information as to how often the user computer device switches between the two states during an active trip. For example, for a 30 minute trip, the DM computing device may determine that the user computer device was in an inactive state for the first 20 minutes of the trip, and in an active state for the remaining 10 minutes of the trip. In this example, the DM computing device may further determine that during the inactive state, the driver received an incoming call and held a conversation for 20 minutes. The DM computing device may categorize the incoming call and the subsequent conversation as the mobile device being in an inactive state by detecting that the call was received through the vehicle's Bluetooth® system rather than through the driver's mobile device. The DM computing device may further determine the geographical location where the incoming call was received (e.g., map coordinates, school zone, construction zone, parking lot) by utilizing a GPS-related system such as a vehicle location system and/or a mobile device locator. In the example embodiment, the driving data and the user device data may be communicated to the DM computing device through at least one of the vehicle controller, the user computer device, and the DM module.

In some embodiments, driving data associated with the driver's driving characteristics may also be tracked in addition to monitoring the state of the driver's user computer device during a trip. In some embodiments where the vehicle is a semi-autonomous or a regular vehicle (e.g., driver-controlled vehicle), such that a driver controls the vehicle during part or the entirety of one or more trips, the DM computing device interprets sensor information to collect and/or generate telematics data (e.g., driving data) associated with driving characteristics of the driver. In some embodiments, the DM computing device includes the DM module that is stored on or part of a mobile device, such as the driver's phone. In these embodiments, the DM module may obtain telematics data from the vehicle via Bluetooth®, Internet, Universal Serial Bus (USB), On-Board Diagnostics (OBDII) port, or any other wired or wireless connection. For example, the vehicle controller may collect vehicle telematics data from the driver's user computer device and/or one or more sensors on the vehicle. Vehicle telematics data may include data from the user computer device and/or one or more of vehicle sensors, and may include navigation, communications, safety, security, and/or "infotainment" data. For example, vehicle telematics data collected and analyzed may include, but is not limited to, braking and/or acceleration data, navigation data, vehicle settings, and/or any other telematics data. This vehicle telematics data can then be provided to the DM computing device through at least one of the vehicle controller, the user computer device, and the DM module.

In further embodiments, the driver is rewarded for having the user computer device in an inactive state during a trip. The DM computing device may calculate driving rewards based on the length at which the driver's user computer device is in an inactive state for a trip. In some embodiments, the DM computing device determines, from the received telematics data, that the driver has stopped the vehicle to use the user computer device (e.g., mobile device). For example, the DM computing device determines from the vehicle sensors, such as GPS and/or a vehicle's tracking system, that the driver has pulled the vehicle off to the side of the road and/or made a brief stop at, for example, a gas station, rest stop, restaurant, and/or convenience store during an active trip to a final destination. In this example, the DM computing device determines that (i) the vehicle is parked (e.g., in a parking mode), and (ii) the mobile device has switched from the inactive state to the active state. Based on the detection, in these embodiments, the DM computing device rewards the driver for stopping the vehicle to use the mobile device rather than using the mobile device while the vehicle is in motion. In other embodiments, the DM computing device rewards the driver for waiting to use the mobile device until the vehicle is in a parking mode, even though the driver has not yet reached the final destination (e.g., finished the active trip). The DM computing device uses telematics data to distinguish between parking mode (e.g., where a vehicle is parked) and temporary halt motions of the vehicle while the driver waits at an intersection, red light, and/or stop sign (e.g., where the driver's foot is actively pressing on the brake pedal). Driving rewards are calculated based on safe driving practices in accordance with standards and guidelines, such as those provided by the National Transportation Safety Board (NTSB) and the National Highway Traffic Safety Administration (NHTSA).

Driving rewards can be based on at least one of distance traveled and duration. Driving rewards may be calculated periodically (e.g., daily, weekly, monthly) based upon a pre-determined timeframe. Driving rewards may be a credit or discount applicable to an insurance payment account associated with an insurance policy of the driver (e.g., monthly discounts applicable to a driver's next statement). Additionally or alternatively, driving rewards may be redeemable for cash. In these embodiments, the DM computing device may transfer the driving rewards via direct deposit to a payment account (e.g., credit account, debit account, and/or prepaid account) associated with the driver. In certain embodiments, the driving rewards may be redeemable as a prepaid credit and/or debit card such as a reloadable prepaid MASTERCARD® gift card. Reward payouts may depend on factors such as the driver's payout preferences (e.g., weekly, monthly, quarterly and/or semi-annual payouts), and the driver's reward redemption preference (e.g., an insurance credit and/or discount applicable to a driver's automobile insurance statement, a direct deposit into a payment account associated with the driver, a reloadable prepaid gift card). For example, a dependent may drive a vehicle owned by a parent. As used herein, the term "dependent" refers to a child, teenager, and/or any other dependent associated with the parent who owns the vehicle. In this example, the parent may use the system described herein to reward the dependent when the dependent drives the vehicle without texting, talking on their smartphone, or otherwise using their smartphone while driving. The reward may take the form of a payment to an account or prepaid payment card associated with the dependent. In addition, the parent could also use the system described herein to penalize the dependent if the dependent texts, talks on their smartphone, or otherwise uses their smartphone while driving. The penalty may take the form of removing funds from an account associated with the dependent and/or freezing a payment card (e.g., temporarily placing a hold on a payment card) associated with the dependent for a period of time.

In further embodiments, the driver is penalized for having the user computer device in an active state during the trip. In these embodiments, the driver may be penalized for switching the user computer device from an inactive state to an active state while the vehicle is in motion (e.g., during the active trip). Additionally or alternatively, the driver may be penalized for the duration over which the user computer device is detected to be in an active state. For example, the DM computing device may determine that the driver's mobile device was switched from an inactive state to an active state 3 times during the trip. In this example, the DM computing device penalizes the driver by reducing the driver's pre-payout accumulated driving rewards (for safe driving behavior) by a predefined amount and/or percentage. For example, if the driver elected to receive a credit on their next insurance policy statement, the credit amount can be reduced due to the driver's use of their mobile device during active trips. In other embodiments, the DM computing device penalizes the driver by disabling certain functions of the driver's mobile device for a designated period of time. In these embodiments, the DM computing device transmits a signal to an application on the driver's mobile device to disable and/or partially disable the mobile device.

In further embodiments, the DM computing device penalizes the driver by deactivating a payment account associated with the driver for a designated period of time. In these embodiments, the DM computing device has a payment account associated with the driver stored in its database. For example, the payment account information may previously have been provided by the driver during a registration process, and/or by an insurer provider associated with the driver to the DM computing device. In another embodiment, the DM computing device may penalize the driver by receiving automatic payments (e.g., payment transfers) from a payment account associated with the driver each time the driver's mobile device is detected to be in an active state. In these embodiments, the driver selects a penalty option where, upon detecting use of the driver's mobile device during an active trip, the DM computing device transmits a payment request for a predetermined amount to a payment network associated with a payment account tied to the driver. The DM computing device may transmit a payment request each time the driver's mobile device is detected to be in an active state. For example, during a registration process, the driver authorizes automatic payments of $5 for every time the driver's mobile device is detected to be in an active state during an active trip. In certain embodiments, the DM computing device transmits a payment request for a total number of active state detections during a predetermined period of time. In the above example, if the DM computing device detected the driver's mobile device in an active state 10 times over a week, the DM computing device transmits a single payment request at the end of the week for $50 to a payment network associated with the driver's payment account.

In further embodiments, the payment account linked with the DM computing device may be that of a named insured, rather than an authorized driver listed on an automobile insurance policy associated with the vehicle. For example, if the named insured is a parent, the linked payment account may be that of the parent's. In this example, the parent's payment account is subject to a driving reward and/or driving penalty (e.g., driving disincentive). Thus, a dependent, such as a teenage driver, listed as an authorized driver under the parent's automobile insurance policy may impact the parent's payment account. For example, if the dependent repeatedly uses their mobile device over a period of time, the DM computing device may temporarily deactivate a payment account associated with the parent. In some embodiments, the DM computing device penalizes the driver based on factors such as the duration of the detected active state and/or the number of occurrences in which the driver's mobile device switches from an inactive state to an active state. For example, if the detected active state is a first time offense, the DM computing device may generate and transmit a warning (e.g., alert message) to the driver. For example, the generated warning may alert the driver of the detected active state, and warn the driver that a penalty will be enforced if the active state is detected a second time.

The DM computing device may further generate a report that includes information as to the state(s) of the user computer device during a trip, the driving data described above, and/or the calculated rewards. The report may be generated daily, weekly, and/or monthly, and the reporting period may depend on how often the driver uses the vehicle. The DM computing device transmits the generated report to the driver's user computer device and/or to the driver via another communication channel, and in some embodiments, the DM computing device also transmits the generated report to a remote-computing device associated with an insurance provider. For example, the generated report may be transmitted to an insurance provider associated with the driver to allow the insurance provider to review the calculations and distribute the driving reward. In another example, where the driver is a new and/or teenage driver insured under a parent's insurance policy, the generated report may be transmitted to the parent of the driver. In another example, the generated report may be transmitted to an insurance provider to generate and/or update a driving profile associated with the driver. The information in the generated report may be used by the insurance provider to adjust the driver's insurance premium.

In an exemplary embodiment, the DM computing device may be used by agency or organization responsible for issuing driving credentials (e.g., driver's licenses or other driving qualifications or endorsements) to determine whether an individual driver qualifies for these driving credentials based on vehicle operation data relating to the individual's driving. The DM computing device may analyze vehicle operation data corresponding to a driver to determine one or more values relating to a safety or quality of the driver's driving. For example, the values may include and/or relate to a total amount of time driven, speed (e.g., with respect to a speed limit), acceleration, braking, turning, use or status of the user computing device while driving, use of turn signals, proximity to other vehicles or objects, other driving events, and/or scores derived from and/or calculated based on such data. The DM computing device may compare these values to thresholds to determine if the driver qualifies for a driving credential (e.g., a drivers license), and if so, may automatically provide access to a digital document relating to these credentials (e.g., a digital driver's license) within a virtual wallet application associated with the driver (e.g., at a user device of the driver). After the virtual document has been issued, the DM computing device may continually monitor subsequent vehicle operation data associated with the driver and control access to the virtual document based on whether driving assessment values associated with the driver continue to meet the corresponding thresholds. The DM computing device may also use the artificial intelligence model to generate reports and/or recommendations for areas to work on to assist the driver in qualifying for the driving credentials.

In the exemplary embodiment, a driver desiring to obtain a driving credential may register via the DM computing device (e.g., upon obtaining a practice or learner's permit), which may be operated by or on behalf of a Department of Motor Vehicles (DMV) or other entity responsible for issuing driving credentials. During the registration, the DM computing device may be configured to store, in a database, identities and/or identifiers associated with one or more registered drivers and baseline biometric information for each of the registered drivers. As described above, this baseline biometric information enables the DM computing device to determine when a registered driver is operating a vehicle. In addition to biometric data, other data relating to the registered driver may also be stored. This may include demographic data (e.g., age, location) or other data based on which a determination may be made to grant the registered driver any driving credentials. For example, in some embodiments, thresholds used to determine whether a registered driver qualifies may depend on an age of the registered driver (e.g., a sixteen-year-old may need to meet a higher set of standards than an eighteen-year-old).

In the exemplary embodiment, when a driver begins to operate a vehicle, the DM computing device may receive biometric data from the vehicle and compare biometric data received from the vehicle to the baseline biometric information to identify a current driver from the plurality of registered drivers. As described above, the vehicle may be configured to collect various types of biometric data, such as image data captured for face identification and/or fingerprint data captured for fingerprint identification. In some embodiments, the DM computing device may continuously collect biometric data while the vehicle is being operated to verify that the same driver is continuing to operate the vehicle and/or determine if a new driver has taken over operation of the vehicle. When the current driver is identified, the DM computing device may log the trip and any vehicle operation data received during the trip in the database in association with the current driver. In some embodiments, in addition to or rather than biometric data, other types of data may be used to identify the current driver, such as a manual entry of data and/or scanning a bar code or other visual code (e.g., on a practice or learner's permit or displayed by the user device).

In the exemplary embodiment, the DM computing device may be configured to collect vehicle operation data of the vehicle while the identified driver is in the vehicle (e.g., during the trip). The vehicle operation data collected may include various different metrics, such as those described above, which may be used to assess the driver's performance and determine whether the driver has met any qualifications of obtaining a driving credential.

In some embodiments, the collected vehicle operation data may include speed data indicative of a speed of the vehicle at a certain time and location. This speed data may be generated by a speedometer, determined based on tracking a geolocation of the vehicle (e.g., using GPS), and/or determined in other ways. The speed data may also include a speed limit at the corresponding time and location. For example, the DM computing device may perform a lookup to determine a speed limit at a give location at which a speed measurement was made. Thus, at any given time, it may be determined whether the vehicle is traveling above or below the speed limit and by how much. This speed data may be used as a factor in determining whether the driver qualifies for a driving credential.

In some embodiments, the collected vehicle operation data may include proximity data obtained from exterior radar sensors, lidar sensors, cameras, and/or other devices capable of determining how close the vehicle is to other vehicles and objects. This data may indicate whether the driver is driving safely. For example, the proximity data may indicate whether the driver is maintaining a safe distance between their vehicle and a preceding vehicle (e.g., depending on a speed the vehicles are traveling, or may indicate whether the vehicle is traveling dangerously close to stationary objects (e.g., roadside objects or debris on the road) at unsafe speeds. Additionally, proximity data may be used to assess parking, for example, by determining an adequate amount of space is maintained around the vehicle during and after parking. This proximity data may be used as a factor in determining whether the driver qualifies for a driving credential.

In some embodiments, the collected vehicle operation data may include interior camera data obtained from an interior camera of the vehicle. This interior camera data may indicate whether the driver is engaging in safe or unsafe practices while driving. For example, the interior camera data may indicate whether the driver is maintaining attention to the road, periodically checking mirrors and/or checking mirrors before lane changes, and/or whether the driver is becoming distracted while driving. This interior camera data may be used as a factor in determining whether the driver qualifies for a driving credential.

In some embodiments, the collected vehicle operation data may include turn signal data. For example, the vehicle may be configured to report when its turn signals are being operated. This data may be compared with camera data and/or location data to determine whether the driver is activating the turn signals before turning or changing lanes. This turn signal data may be used as a factor in determining whether the driver qualifies for a driving credential.

In some embodiments, the collected vehicle operation data may include other types of data. For example, any of the other types of data described herein, such as a total amount of time or distance the driver has undergone instruction, state data of a user computing device of the driver and/or other telematics data may be used to determine whether the driver is safely operating the vehicle and/or the driver qualifies for a driving credential.

In the example embodiment, the DM computing device may be configured to generate, by applying an artificial intelligence model to the collected vehicle operation data stored in association with the first driver, at least one driver assessment value. The driver assessment value may correspond to a parameter such as total amount of time or distance driven, or may be another type of score or value derived from the vehicle operation data that indicates, for example, how safe the driver has driven and/or how well the driver has mastered certain aspects of driving. For example, scores may be provided for a total amount of time driven, speed (e.g., with respect to a speed limit), acceleration, braking, turning, use or status of the user computing device while driving, use of turn signals, proximity to other vehicles or objects, other driving events, and/or scores derived from a combination of these factors, such as an overall driving or safety score. The generated driver assessment values may be stored in the database in association with the corresponding driver.

The DM computing device may be configured to train the artificial intelligence model using sample data (e.g., pairs of sets of sample vehicle operation data and sets of sample driver assessment values that should result from the sample vehicle operation data), historical data, and/or some combination thereof. In some embodiments, the artificial intelligence model may be periodically or continuously retrained as new data (e.g., vehicle operation data and associated outcomes) becomes available. Alternatively, other supervised or unsupervised machine learning techniques may be used to train such a model.

In the exemplary embodiment, the DM computing device may be configured to determine a registered driver qualifies for a driving credential by comparing the at least one driver assessment value associated with the driver to at least one threshold corresponding to the driving credential. For example, the thresholds may specify a total time or distance that needs to be driven during driving instruction and/or certain minimum scores relating to driving safety and/or driving abilities (e.g., parking and/or driving in high-traffic areas). In some embodiments, the specific thresholds used to determine whether a particular driver qualify for the driving credential may depend on other information relating to the driver. For example, in some cases, the thresholds may depend on the age of the driver, in which a younger driver (e.g., a sixteen-year-old) may be subject to more stringent thresholds than an older driver (e.g., an eighteen-year-old). In another example, the thresholds may depend on a location where the driver lives and/or has practiced driving. For example, the thresholds may depend on a jurisdiction in which the driver lives, whether the driver lives in an urban, suburban, and/or rural area, and/or whether the driver lives in an area deemed to be safer or less safe for driving. In some embodiments, the thresholds may be based on a comparison to other drivers. For example, a driver may qualify if their driver assessment values are better than a certain predefined percentage of other drivers. In addition to driving credentials, these driver assessment values and thresholds may be used to determine if the driver qualifies for other driving rewards as described herein.

In the exemplary embodiment, the DM computing device may be configured to, in response to a determination that a driver has qualified for a driving credential, provide access to a digital document associated with the driving credential. For example, the driver may have a user device configured to execute a virtual wallet application. If the driver qualifies for a driving credential, the DM computing device may communicate with the user device to cause a digital document (e.g., a virtual driver license) to automatically be provided within the virtual wallet, thus enabling the driver to obtain instant proof of their driving credential. In some embodiment, the digital document being present in the virtual wallet may enable the driver to unlock or activate (e.g., using an NFC, Bluetooth, or other wireless connection) vehicles to which the driver has authorized access.

In some embodiments, the DM computing device may control access to the digital document, such as by locking or removing the digital document from the virtual wallet, based on an ongoing analysis of the driver's driving. For example, the DM computing device may continue to collect vehicle operation data after the driver has earned the driving credential to determine updated driver assessment values. If the updated driver assessment values fail to meet the required thresholds, the DM computing device may determine to, for example, temporarily suspend or revoke the driving credentials and/or impose certain restrictions (e.g., locations or times of day where the driver can drive unaccompanied) until the thresholds are met. In such cases, the DM computing device may automatically remove the digital document from the virtual wallet and/or modify the digital document to indicate that it has a locked or restricted status.

In some embodiments, the DM computing device may be further configured to determine a cost, such as a cost associated with obtaining the driving credential, based on the at least one driver assessment value. For example, different fee levels may be associated with obtaining the driving credential and/or the corresponding digital document, each with different associated thresholds, and the DM computing device may determine the fee based on which of these thresholds are met by the corresponding driver assessment values. Alternatively, the cost may be calculated as a function of the one or more driver assessment values. Other costs associated with the vehicle such as, for example, registration fees, personal property tax, insurance costs, emergency service costs, and/or other costs may be similarly determined or calculated based on the driver assessment values associated with the driver. In cases where these costs are recurring, updated driver assessment values based on new vehicle operation data may be used each time the cost is determined.

In some embodiments, the DM computing device may be further configured to generate, by applying the artificial intelligence model to the collected vehicle operation data stored in association with the first driver, at least one recommendation for improving driving skills. For example, the DM computing device may determine that, for a driver, a driver assessment value and/or score generated by the artificial intelligence model that is associated with parallel parking needs to be improved before the driver can qualify for driving credentials. The DM computing device may then generate a recommendation that the driver practice parallel parking. The DM computing device may similarly identify other areas of strength or areas of improvements, such as reducing speeding, leaving greater distance between vehicles, reducing distractions or usage of the user device during driving, checking mirrors or blind spots, or any other steps to driver safer and potentially qualify for driving credentials. The driver may then focus on these areas when practicing driving. Such recommendations may be displayed within a report provided by the DM to the user, for example, within a web page and/or app accessible through the driver's user device. The report may also include driver assessment values, vehicle operation data, charts, graphs, links to instructional videos, and/or other information that may assist the driver in reaching a driving proficiency necessary for obtaining a desired driver credential. In certain embodiments, the reports may also include data that enables a driver to compare their scores to others, such as average for other practicing drivers in the area or for drivers as a whole. Such recommendations and reports may also be generated after the driver has obtained the desired driver credential, so that the driver may continue with driving skill improvement and maintaining any earned driver credentials. In some embodiments, these recommendations and reports may be generated and updated in real time based on newly available data.

In some embodiments, the DM computing device may analyze groups of drivers, such as all the drivers trained by a particular driving instructor in order to assess and/or generate recommendations for the driving instructor. Such an analysis may be performed similarly to the analysis for an individual driver, with the artificial intelligence model instead using vehicle operation data associated with a group of drivers, such as those associated with the particular driving instructor. Based on this data, the DM computing device may generate driver instructor assessment values or scores, reports, and recommendations for improvement for the driving instructor. For example, if an instructor's students tend to struggle with parallel parking, the DM computing device may generate a recommendation that the driving instructor spend more time with each student practicing parallel parking. In some embodiments, this assessment o a driving instructor may be used, for example, to determine appropriate compensation for driving instructor services and/or made available to the public to assist in selection of a driving instructor.

The technical effect of the systems and methods described herein is achieved by performing at least one of the following steps: (i) detecting a user computer device associated with the driver inside the vehicle, wherein the user computer device is in an inactive state; (ii) collecting state data of the user computer device, the state data including data as to a state of the user computer device during a currently occurring trip, the state being at least one of an inactive state and an active state; (iii) collecting vehicle operation data of the vehicle while the driver and the user computer device are inside the vehicle, the vehicle operation data including vehicle telematics data; (iv) comparing the collected vehicle operation data and the collected state data of the user computer device to determine whether the user computer device was activated during the currently occurring trip; (v) causing a driving reward to be applied to an account associated with the driver for inactivity of the user computer device during the currently occurring trip, the inactivity being based on the inactive state; (vi) having the DM computing device communicate with the vehicle (e.g., via the vehicle's vehicle controller), the user computer device, and a payment network to transfer funds (e.g., driving rewards) to a payment account associated with the driver; and (vi) storing driver data associated with each driver of the vehicle, the driver data including vehicle operation data, payment account data, and driving reward data The resulting technical effect achieved by the systems and methods described herein is at least one of: (i) accurately monitoring the actions of a driver in real-time to ensure the driver is not driving while using a handheld mobile device such as a cell phone; (ii) accurately identifying a driver of a trip using biometric data; (iii) increasing driver compliance with safe driving practices by calculating driving rewards; (iv) improving real-time data collection of a driver's driving behavior by capturing continuous data as to a driver's usage of a handheld device during a trip; and/or (v) continuously improving the accuracy of data used to make insurance decisions; (vi) enabling an objective computer-based determination of whether a driver should be granted driving credentials by analyzing vehicle operation data derived from vehicle sensors using an artificial intelligence model; (vii) enabling an ability to provide in real time proof of driving credentials by providing a digital document associated with the driving credentials in a virtual wallet application in response to a determination that the driving credentials should be granted; (viii) enabling an ability to controlling access to a digital document associated with driving credentials of a driver by continuously analyzing vehicle operation data of the driver using an artificial intelligence model; (ix) enabling an ability to generate recommendations for improving driving skills by analyzing vehicle operation data derived from vehicle sensors using an artificial intelligence model; and/or (x) enabling an ability to determining a cost associated with obtaining a driving credential by analyzing vehicle operation data derived from vehicle sensors using an artificial intelligence model.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram of an example vehicle 100. In some embodiments, vehicle 100 may be an autonomous or semi-autonomous vehicle capable of fulfilling the transportation capabilities of a traditional automobile or other vehicle. In these embodiments, vehicle 100 may be capable of sensing its environment and navigating without human input. In other embodiments, vehicle 100 may be a "driver-needed" vehicle, such as a traditional automobile that is controlled by a human driver 115.

As shown in FIG. 1, vehicle 100 may include a vehicle controller 110 associated with vehicle 100, and a mobile device 125 associated with a vehicle user in communication with a remote driver monitoring (DM) server (e.g., DM computing device) 210. In the example embodiment, vehicle controller 110 and/or mobile device 125 can include a DM module 130 that enables vehicle controller 110 and mobile device 125 to communicate with DM computing device 210. Telematics data and mobile device 125 usage data can be captured by vehicle controller 110 and/or mobile device 125, and transmitted to DM computing device 210 during a trip with the help of DM module 130. In the example embodiment, vehicle 100 may also include and employ one or more sensors 105, such as biometric sensors 105 to determine which vehicle user is driver 115 for a trip. Biometric sensors 105 may include any sensor configured to receive a biological signal uniquely identifying an individual, such as, but not limited to, retinal scanners, fingerprint scanners, facial recognition devices, and weight scales. In the example embodiment, vehicle 100 may have one or more biometric input devices (e.g., biometric sensors 105) to facilitate the sampling of biometric data from users of vehicle 100. Biometric input devices may include, but are not limited, to fingerprint scanners on a component of vehicle 100 only easily accessible by the driver, such as the dashboard, the console, or the steering wheel. Biometric data may include fingerprints, DNA, facial images, retinal images, and/or voiceprints. In some embodiments, the biometric input device collects biometric data (e.g., sample data) and transmits the data to other system components for analysis. Additionally or alternatively, vehicle 100 may have a weight scale (or pressure sensor) associated with the driver's seat and/or with the passenger's seats. Vehicle 100 may have a registered weight associated with each user of vehicle 100. When any vehicle user sits in any of the seats, their weight may be measured by the scale and the particular vehicle user may be identified.

Vehicle 100 may also include sensors 105 that detect the current surroundings and location of vehicle 100. Sensors 105 may include, but are not limited to, radar, LIDAR, Global Positioning System (GPS), video devices, imaging devices, cameras, audio recorders, and computer vision. Sensors 105 may also detect conditions of vehicle 100, such as speed, acceleration, gear, braking, cornering, and other conditions related to the operation of vehicle 100, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. Furthermore, sensors 105 may include impact sensors that detect impacts to vehicle 100, including force and direction and sensors that detect actions of vehicle 100, such the deployment of airbags.

In some embodiments, in addition to detecting the presence of driver 115, sensors 105 may also detect the presence of one or more passengers 120 in vehicle 100. In these embodiments, sensors 105 may detect the presence of fastened seatbelts, the weight in each seat in vehicle 100, heat signatures, or any other method of detecting information about driver 115 and passengers 120 in vehicle 100.

In certain embodiments, in addition to biometric sensors 105, vehicle 100 may include occupant position sensors to determine a location and/or position of each occupant (e.g., driver 115 and, in some embodiments, passengers 120) in vehicle 100. In these embodiments, the location of an occupant may identify a particular seat or other location within vehicle 100 where the occupant is located. The position of the occupant may include the occupant's body orientation, the location of specific limbs, and/or other positional information. In one example, sensors 105 may include an in-cabin facing camera, LIDAR, radar, weight sensors, accelerometer, gyroscope, compass and/or other types of sensors to identify the location and/or position of occupants within vehicle 100.

Vehicle controller 110 may be configured to recognize driver 115 as an authorized (e.g., registered) driver from biometric data received from sensors 105 (e.g., biometric input device). Vehicle controller 110 may be configured to communicate with driver's 115 mobile device 125, such as a smartphone. Mobile device 125 may be similar to user computer device 206 (shown in FIG. 2). In the example embodiment, vehicle controller 110 wirelessly communicates with mobile device 125 in vehicle 100. In these embodiments, vehicle controller 110 may be capable of communicating with mobile device 125 of a vehicle occupant, such as driver 115, through DM module 130. For example, DM module 130 can be a software application on mobile device 125. In the example embodiment, upon detecting the vehicle user as driver 115, vehicle 100, via vehicle controller 110, may communicate with mobile device 125, for example, via the Internet, Bluetooth®, USB, OBDII port, or any other wired or wireless connection (e.g., Near Field Communication) over one or more radio links or wireless communication channels to automatically activate (e.g., launch) and/or communicate with DM module 130. For example, DM module 130 may be an application that detects a state of mobile device 125 and/or switches mobile device 125 from an active state to an inactive state. In some embodiments, vehicle 100 may have "application pairing" functionality such that driver 115 may engage with an application on a user interface at vehicle 100 while their mobile device 125 is in an inactive state. In other embodiments, vehicle 100 may be in communication with one or more mobile devices 125 that are each associated with one or more vehicle occupants of vehicle 100.

Using the application pairing functionality, vehicle controller 110 may further determine which mobile device(s) 125 are within vehicle 100 during a trip. For example, each vehicle occupant may pair one or more mobile device 125 (e.g., smartphones, tablets, laptops, wearables, etc.) to vehicle 100. Vehicle 100 may then pair with one or more mobile device 125 that are within vehicle 100 during a trip. Vehicle controller 110 may record which device(s) 125 pair with vehicle 100 for a trip. Using the received biometric data from the biometric sensors, vehicle controller 110 may confirm that the vehicle occupant associated with the paired mobile device 125 is driver 115 for the trip.

In some embodiments, vehicle controller 110 may include a communication interface device (shown in FIG. 2) that includes a display screen or touchscreen. The communication interface device may be capable of displaying information to and receiving information from driver 115. In some embodiments, after mobile device 125 of driver 115 pairs with vehicle 100, select applications and functions of mobile device 125, such as navigation, call dialer, and music may be displayed on the communication interface device of vehicle 100. In these embodiments, mobile device 125 may be in a locked (e.g., inactive) state, and driver 115 may access the select applications through vehicle's 100 communication interface.

In some embodiments, vehicle 100 may include autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with vehicle controller 110.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

Moreover, in addition to biometric data, where vehicle 100 is an autonomous or semi-autonomous vehicle, vehicle controller 110 may interpret sensory information from sensors 105 to determine usage of vehicle 100 by one or more vehicle users (e.g., driver 115) for each trip undertaken by vehicle 100. As used herein, "trip" refers to a discrete use of vehicle 100, from an initial starting point (e.g., starting vehicle 100) to an end point (e.g., reaching a destination or turning off vehicle 100). Accurately determining usage of vehicle 100 by driver 115 for a trip may facilitate collecting and/or generating vehicle-based telematics data associated with driver 115.

In further embodiments, vehicle controller 110 may interpret the sensory information to identify driver 115 in relation to passengers 120 present in vehicle 100. For example, vehicle computer device 110 may determine positional information for at least one vehicle user present in vehicle 100 during a trip. Positional information may include a position of a vehicle user, a direction of facing of the vehicle user, a size of the vehicle user, and/or a skeletal positioning of the vehicle user. The position of the vehicle user may include which seat the vehicle user occupies. The direction of facing of the vehicle user may include whether the vehicle user is facing forward, reaching forward, reaching to the side, and/or has his/her head turned. The size of the vehicle user may determine whether the vehicle user is an adult or a child. The size of the vehicle user may also include the vehicle user's height. The skeletal positioning may include positioning of the vehicle user's joints, spine, arms, legs, torso, neck face, head, major bones, hands, and/or feet.

In other embodiments, vehicle controller 110 may use additional and/or alternative vehicle telematics data in addition to biometric data, such as sensor information from sensors 105 within a paired mobile device 125, to verify which vehicle occupant is the driver 115 when multiple mobile devices 125 pair with vehicle 100 during a single trip. In one example, vehicle controller 110 may use gyroscope and/or accelerometer sensor information from the paired mobile device 125 to identify which side of vehicle 100 each occupant used to enter vehicle 100 and/or exit vehicle 100. In other words, vehicle controller 110 may access and process data from the gyroscope and/or accelerometer for each mobile device 125 to determine whether the user of the mobile device 125 entered vehicle 100 on the left (e.g., driver) or the right (e.g., passenger). If only two user computer devices 206 are present and vehicle controller 110 determines that a first mobile device 125 is associated with the left side of vehicle 100 and a second mobile device 125 is associated with the right side of vehicle 100, vehicle controller 110 may record that the user associated with the first mobile device 125 is the driver 115 and the user of the second mobile device 125 is a passenger 120 for the trip. It should be understood that although the left side is associated with a "driver's side" and the right side is associated with a "passenger side" herein, as is the custom in the United States of America, this method is easily applied to other driving customs in which the left side is a passenger side and the right side is the driver's side.

Sensors 105 may detect the current surroundings and location of vehicle 100. Sensors 105 may include, but are not limited to, radar, LIDAR, Global Positioning System (GPS), video devices, imaging devices, cameras, audio recorders, and computer vision. Sensors 105 may also include sensors that detect conditions of vehicle 100, such as speed, acceleration, gear, braking, cornering, and other conditions related to the operation of vehicle 100, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. Furthermore, sensors 105 may include impact sensors that detect impacts to vehicle 100, including force and direction and sensors that detect actions of vehicle 100, such the deployment of airbags. In the example embodiment, all data (e.g., vehicle telematics data, biometric data, sensor data, mobile device 125 usage data) collected by vehicle controller 110 and mobile device 125 is transmitted to DM computing device 210 in real-time via DM module 130.

While vehicle 100 may be an automobile in the example embodiment, in other embodiments, vehicle 100 may be, but is not limited to, other types of ground craft, aircraft, and watercraft vehicles.

Figure 2:
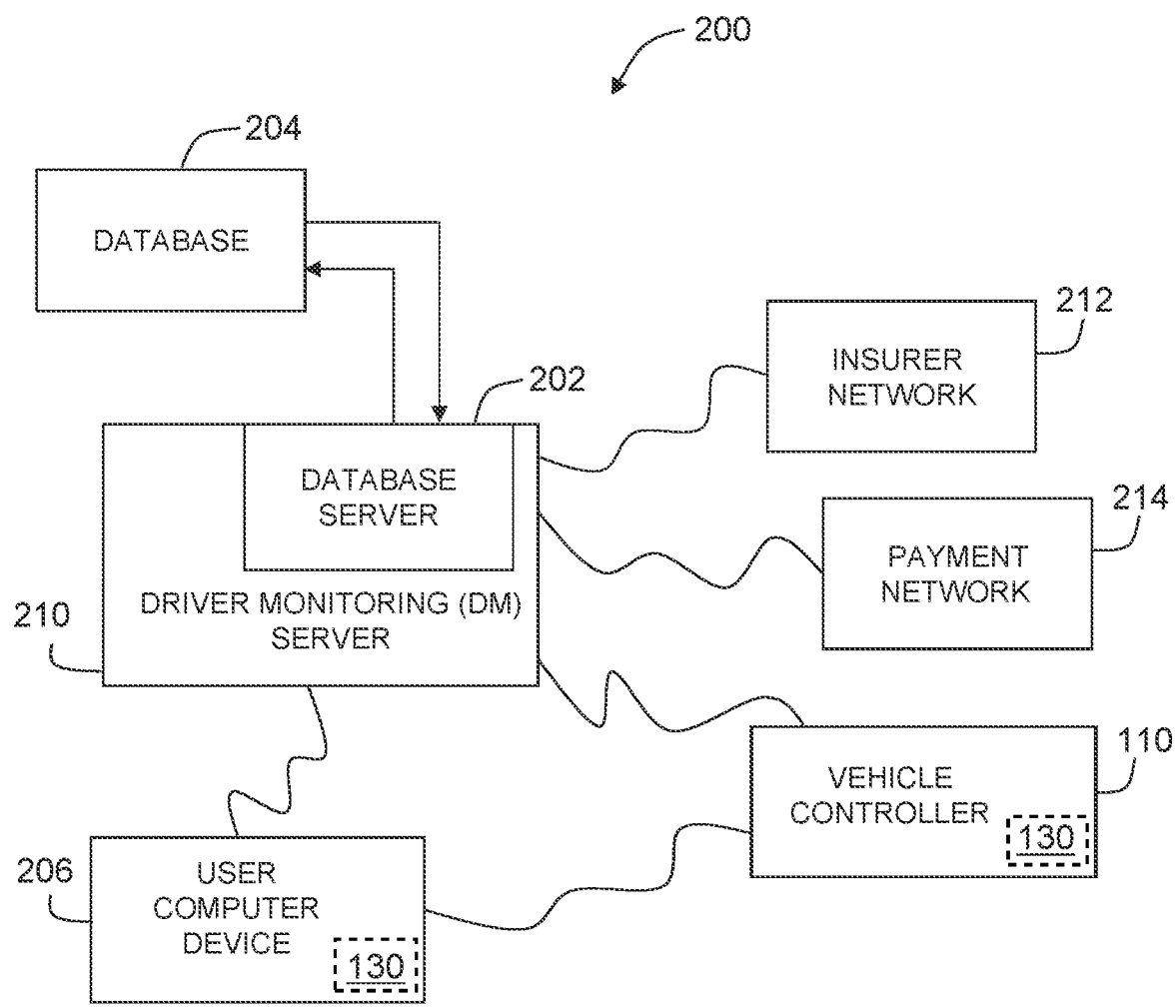
Figure 4:
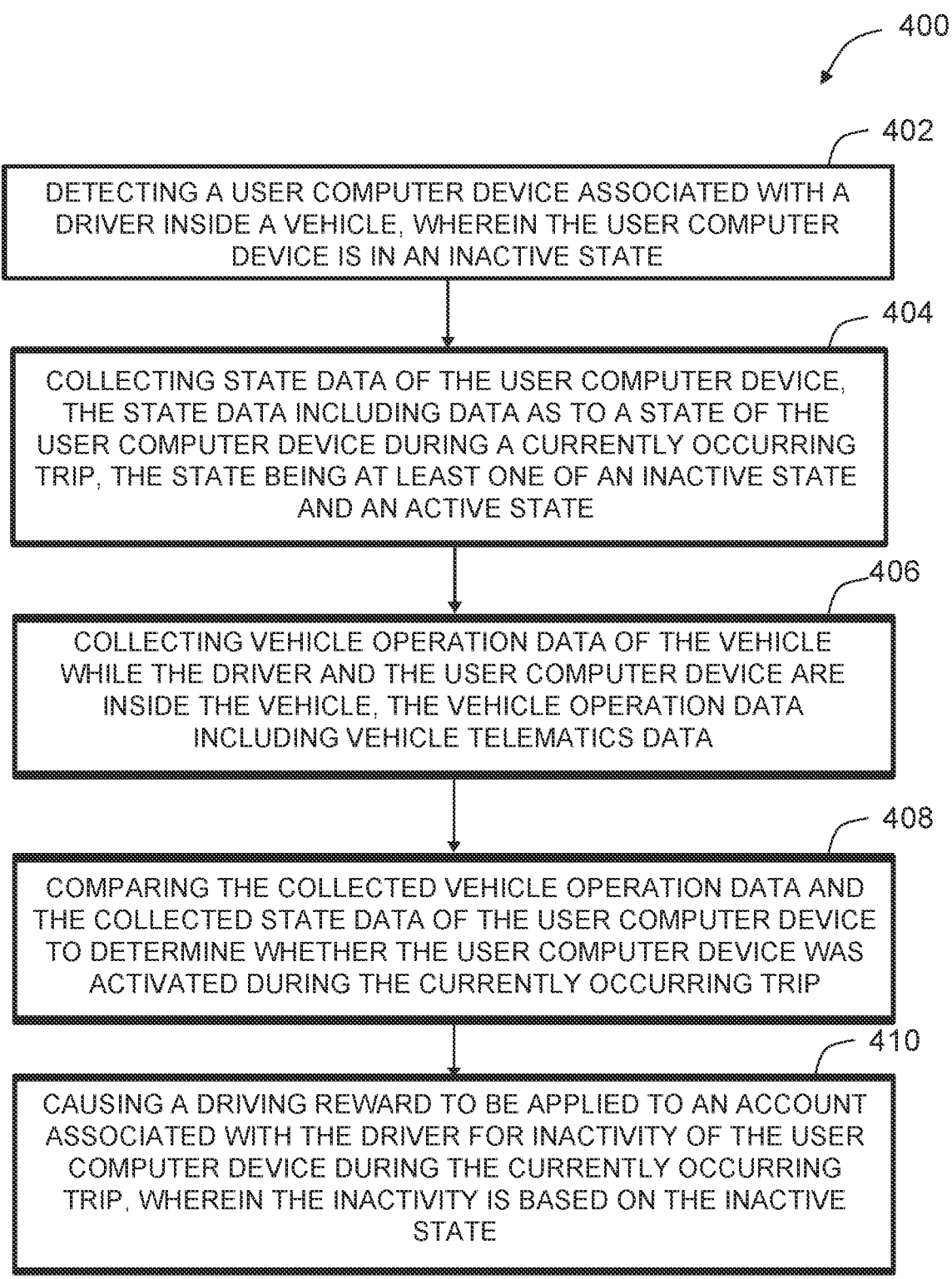
Figure 8A:
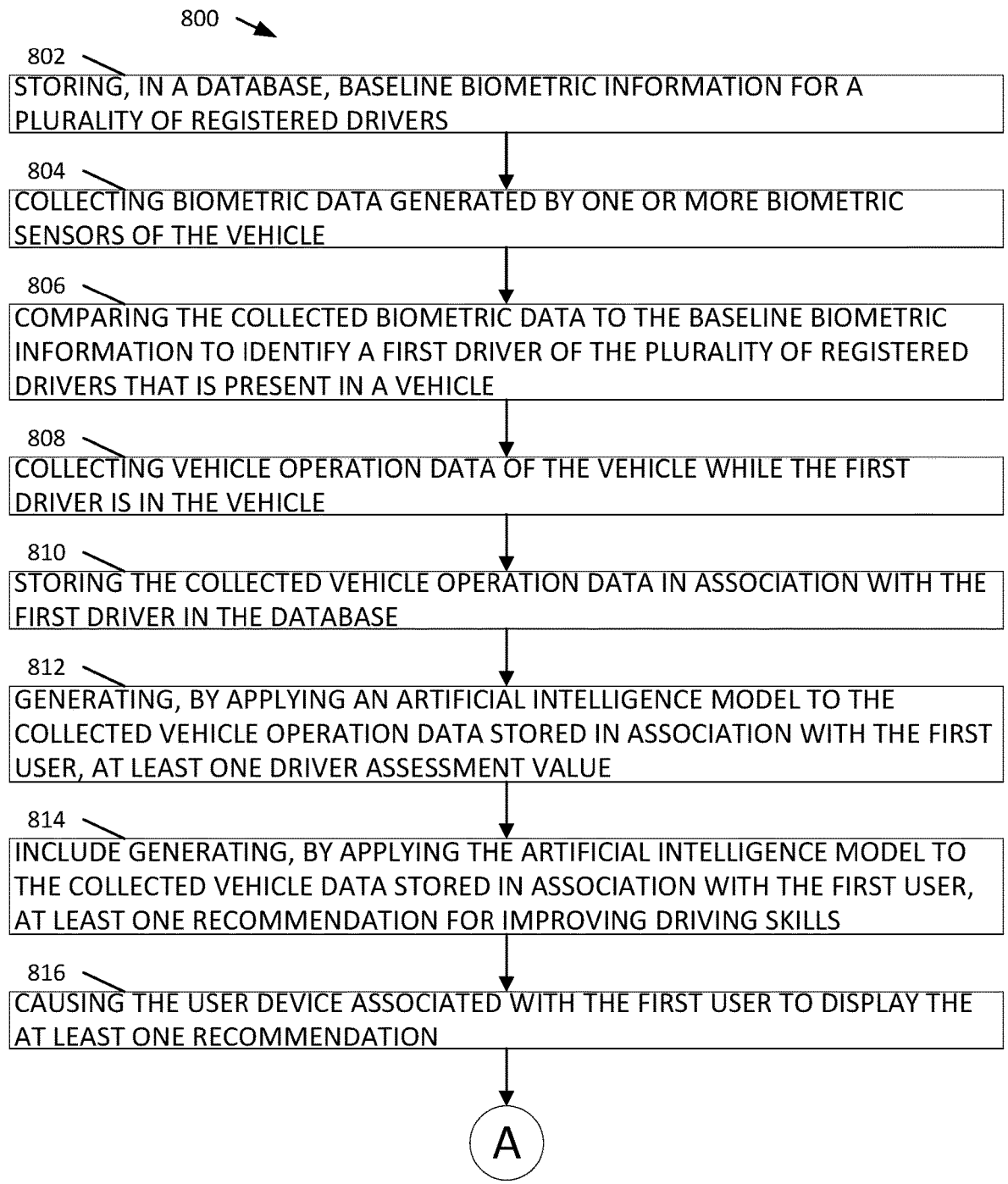
FIG. 8A illustrates a flow chart of another example process for monitoring driving behavior of a driver using the DM computing device shown in FIG. 1, in accordance with the present disclosure.
Figure 8B:
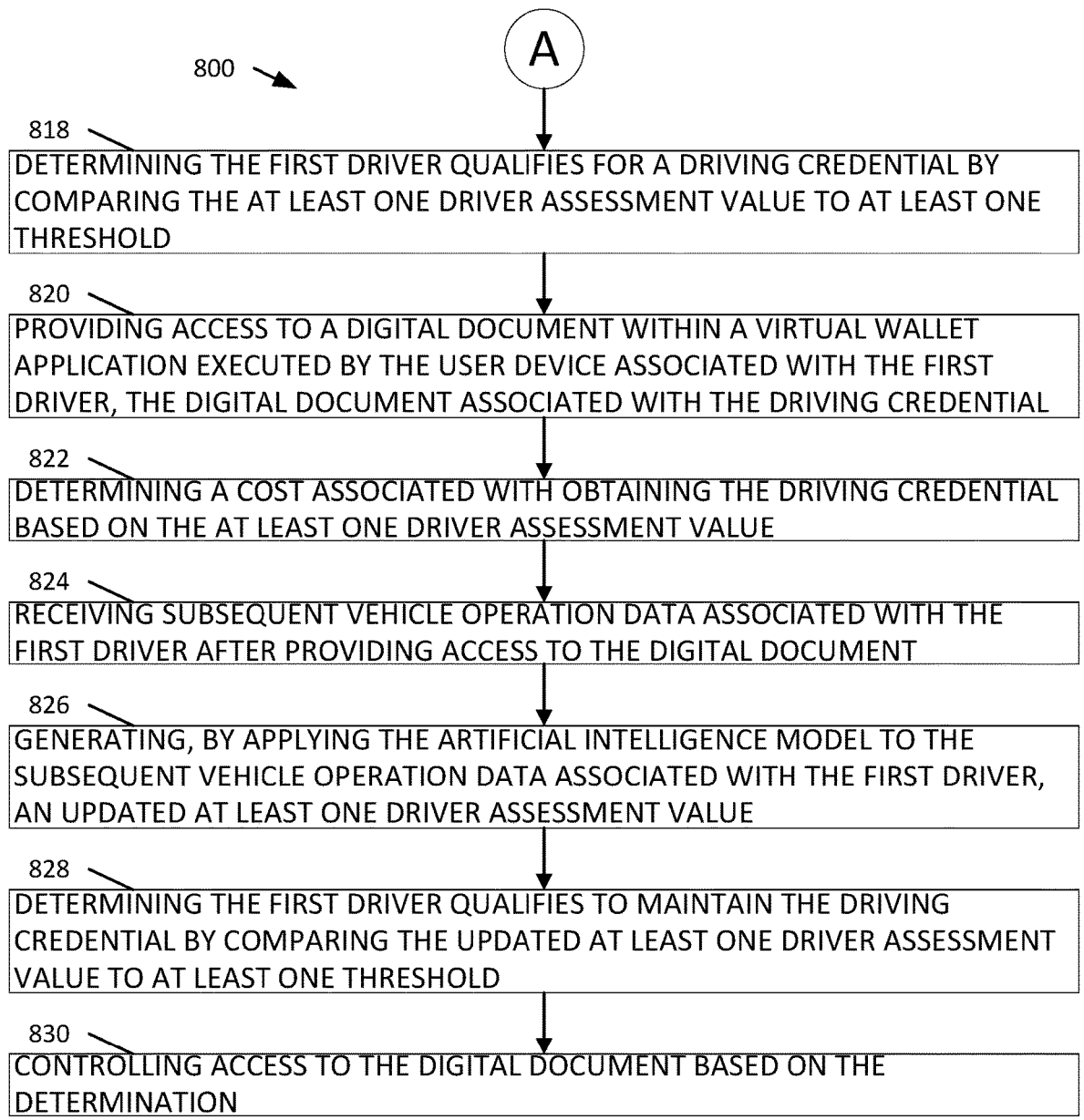

FIG. 2 depicts a simplified block diagram of an example system 200 for implementing process shown in FIGS. 4, 8A, and 8B. In the example embodiment, system 200 may be used for monitoring driving behavior of a driver in real-time. As described below in more detail, DM computing device 210 (a backend server that is in communication with DM module 130 locally in vehicle 100 as part of a user computer device 206 and/or vehicle controller 110) may be configured to (i) detect a user computer device associated with a driver inside a vehicle; (ii) collect state data of the user computer device, the state data including data as to a state of the user computer device during a currently occurring trip, the state being at least one of an inactive state and an active state; (iii) collect vehicle operation data of the vehicle while the driver and the user computer device are inside the vehicle, the vehicle operation data including vehicle telematics data; (iv) compare the collected vehicle operation data and the collected state data of the user computer device to determine whether the user computer device was activated during the currently occurring trip; and/or (v) cause a driving reward to be applied to an account associated with the driver for inactivity of the user computer device during the currently occurring trip, wherein the inactivity is based on the inactive state.

In the example embodiment, user computer devices 206 are computers that include a web browser or a software application, which enables user computer devices 206 to be in communication with DM computing device 210, vehicle controller 110, and insurer network 212 using the Internet or other wireless network (e.g., Bluetooth®). More specifically, user computer devices 206 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 206 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computer device 206 may also be mobile device 125 and/or vehicle controller 110, both shown in FIG. 1.

A database server 202 may be communicatively coupled to a database 204 that stores data. In one embodiment, database 204 may include sensor data such as biometric data of driver 115 and a record as to a state (e.g., inactive and active) of user computer device 206 during a current trip, past trips, and/or trips over a predetermined period of time (e.g., every week, month, or couple of months). In a further embodiment, database 204 may also include payment account information associated with driver 115, such as a payment account number, a signed direct deposit authorization form, and/or a routing number. Database 204 may further include information, such as accumulated driving rewards associated with driver 115, reward payout preferences, and/or selected penalty options. In the example embodiment, database 204 may be stored remotely from DM computing device 210. In some embodiments, database 204 may be decentralized. In the example embodiment, a user, such as driver 115, may access database 204 via user computer device 206 by logging onto DM computing device 210, as described herein.

DM computing device 210 may be communicatively coupled with one or more user computer devices 206 via DM module 130. In some embodiments, DM computing device 210 may also be communicatively coupled with vehicle controller 110 via DM module 130. In some embodiments, DM computing device 210 may be associated with, or is part of a computer network associated with an insurance provider, or in communication with the insurance provider's computer network, such as insurer network 212. In other embodiments, DM computing device 210 may be associated with a third party and is merely in communication with the insurance provider's computer network. More specifically, DM computer device 210 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

In the exemplary embodiment, DM computing device 210 is also in communication with a payment network 214 (e.g., payment processing network) associated with a payment account tied to driver 115. Payment network 214 may relate to a transaction card system, such as a credit card payment system using MASTERCARD® interchange network. The MASTERCARD® interchange network is a set of proprietary communications standards promulgated by Mastercard International Incorporated for the exchange of financial transaction data and the settlement of funds between financial institutions that are members of Mastercard International Incorporated. (MASTERCARD® is a registered trademark of Mastercard International Incorporated located in Purchase, New York). Payment processing network 214 includes at least a payment processor for processing payment transactions. Payment processing network 214 may further include an issuer/financial institution associated with driver 115 (where the issuer/financial institution issues payment accounts/cards to a cardholder (e.g., payment account holder) such as driver 115), an issuer/financial institution associated with DM computing device 210, and/or an issuer/financial institution associated with an insurance provider, such as insurer network 212. In embodiments where driver 115 has elected to receive driving rewards, such as a direct deposit to their payment account, DM computing device 210 may initiate payments into a payment account associated with driver 115 by communicating with the driver's 115 issuer/financial institution. In embodiments where driver 115 has elected to participate in a penalty system, DM computing device 210 may be configured to receive automatic payments from a payment account associated with driver's 115 issuer/financial institution. In certain embodiments, an issuer/financial institution associated with insurer network 212 may release payments to a payment account associated with driver 115. In these embodiments, DM computing device 210 may generate and transmit a report summarizing the accumulated driving rewards to the insurer network 212 for insurer network 212 to use in releasing the driving rewards to driver 115 via direct deposit. In certain embodiments where driver 115 has elected to participate in a penalty system, an issuer/financial institution associated with insurer network 212 may receive automatic payments from a payment account associated with driver 115. In these embodiments, DM computing device 210 may generate and transmit a report and/or a message to insurer network 212 informing insurer network 212 of DM computing device's 210 detection of driver's 115 user computer device 206 in an active state during an active trip.

DM computing device 210 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In still further embodiments, DM computing device 210 may be separate from both vehicle controller 110 and mobile device 125 and merely be in communication with them to monitor driver 115 and vehicle 100.

In an exemplary embodiment, DM computing device 210 may be used by agency or organization responsible for issuing driving credentials (e.g., driver's licenses or other driving qualifications or endorsements) to determine whether an individual driver qualifies for these driving credentials based on vehicle operation data relating to the individual's driving. DM computing device 210 may analyze vehicle operation data corresponding to a driver to determine one or more values relating to a safety or quality of the driver's driving. For example, the values may include and/or relate to a total amount of time driven, speed (e.g., with respect to a speed limit), acceleration, braking, turning, use or status of the user computing device while driving, use of turn signals, proximity to other vehicles or objects, other driving events, and/or scores derived from and/or calculated based on such data. DM computing device 210 may compare these values to thresholds to determine if the driver qualifies for a driving credential (e.g., a drivers license), and if so, may automatically provide access to a digital document relating to these credentials (e.g., a digital driver's license) within a virtual wallet application associated with the driver (e.g., user computer device 206). After the virtual document has been issued, DM computing device 210 may continually monitor subsequent vehicle operation data associated with the driver and control access to the virtual document based on whether driving assessment values associated with the driver continue to meet the corresponding thresholds. DM computing device 210 may also use the artificial intelligence model to generate reports and/or recommendations for areas to work on to assist the driver in qualifying for the driving credentials.

In the exemplary embodiment, a driver desiring to obtain a driving credential may register via DM computing device 210 (e.g., upon obtaining a practice or learner's permit), which may be operated by or on behalf of a Department of Motor Vehicles (DMV) or other entity responsible for issuing driving credentials. During the registration, DM computing device 210 may be configured to store, in database 204, identities and/or identifiers associated with one or more registered drivers and baseline biometric information for each of the registered drivers. As described above, this baseline biometric information enables DM computing device 210 to determine when a registered driver is operating a vehicle such as vehicle 100. In addition to biometric data, other data relating to the registered driver may also be stored. This may include demographic data (e.g., age, location) or other data based on which a determination may be made to grant the registered driver any driving credentials. For example, in some embodiments, thresholds used to determine whether a registered driver qualifies may depend on an age of the registered driver (e.g., a sixteen-year-old may need to meet a higher set of standards than an eighteen-year-old).

In the exemplary embodiment, when a driver begins to operate vehicle 100, DM computing device 210 may receive biometric data from vehicle controller 110 and compare biometric data received from vehicle controller 110 to the baseline biometric information to identify a current driver from the plurality of registered drivers. As described above, vehicle 100 may be configured to collect various types of biometric data, such as image data captured for face identification and/or fingerprint data captured for fingerprint identification. In some embodiments, DM computing device 210 may continuously collect biometric data while vehicle 100 is being operated to verify that the same driver is continuing to operate vehicle 100 and/or determine if a new driver has taken over operation of vehicle 100. When the current driver is identified, DM computing device 210 may log the trip and any vehicle operation data received during the trip in database 204 in association with the current driver. In some embodiments, in addition to or rather than biometric data, other types of data may be used to identify the current driver, such as a manual entry of data and/or scanning a bar code or other visual code (e.g., on a practice or learner's permit or displayed by user computer device 206).

In the exemplary embodiment, DM computing device 210 may be configured to collect vehicle operation data of vehicle 100 while the identified driver is in vehicle 100 (e.g., during the trip). The vehicle operation data collected may include various different metrics, such as those described above, which may be used to assess the driver's performance and determine whether the driver has met any qualifications of obtaining a driving credential.

In some embodiments, the collected vehicle operation data may include speed data indicative of a speed of vehicle 100 at a certain time and location. This speed data may be generated by a speedometer, determined based on tracking a geolocation of vehicle 100 (e.g., using GPS), and/or determined in other ways. The speed data may also include a speed limit at the corresponding time and location. For example, DM computing device 210 may perform a lookup to determine a speed limit at a give location at which a speed measurement was made. Thus, at any given time, it may be determined whether vehicle 100 is traveling above or below the speed limit and by how much. This speed data may be used as a factor in determining whether the driver qualifies for a driving credential.

In some embodiments, the collected vehicle operation data may include proximity data obtained from exterior radar sensors, lidar sensors, cameras, and/or other devices capable of determining how close vehicle 100 is to other vehicles and objects. This data may indicate whether the driver is driving safely. For example, the proximity data may indicate whether the driver is maintaining a safe distance between vehicle 100 and a preceding vehicle (e.g., depending on a speed the vehicles are traveling, or may indicate whether vehicle 100 is traveling dangerously close to stationary objects (e.g., roadside objects or debris on the road) at unsafe speeds. Additionally, proximity data may be used to assess parking, for example, by determining an adequate amount of space is maintained around vehicle 100 during and after parking. This proximity data may be used as a factor in determining whether the driver qualifies for a driving credential.

In some embodiments, the collected vehicle operation data may include interior camera data obtained from an interior camera of vehicle 100. This interior camera data may indicate whether the driver is engaging in safe or unsafe practices while driving. For example, the interior camera data may indicate whether the driver is maintaining attention to the road, periodically checking mirrors and/or checking mirrors before lane changes, and/or whether the driver is becoming distracted while driving. This interior camera data may be used as a factor in determining whether the driver qualifies for a driving credential.

In some embodiments, the collected vehicle operation data may include turn signal data. For example, vehicle 100 may be configured to report when its turn signals are being operated. This data may be compared with camera data and/or location data to determine whether the driver is activating the turn signals before turning or changing lanes. This turn signal data may be used as a factor in determining whether the driver qualifies for a driving credential.

In some embodiments, the collected vehicle operation data may include other types of data. For example, any of the other types of data described herein, such as a total amount of time or distance the driver has undergone instruction, state data of a user computing device of the driver and/or other telematics data may be used to determine whether the driver is safely operating vehicle 100 and/or the driver qualifies for a driving credential.

In the example embodiment, DM computing device 210 may be configured to generate, by applying an artificial intelligence model to the collected vehicle operation data stored in association with the first driver, at least one driver assessment value. The driver assessment value may correspond to a parameter such as total amount of time or distance driven, or may be another type of score or value derived from the vehicle operation data that indicates, for example, how safe the driver has driven and/or how well the driver has mastered certain aspects of driving. For example, scores may be provided for a total amount of time driven, speed (e.g., with respect to a speed limit), acceleration, braking, turning, use or status of the user computing device while driving, use of turn signals, proximity to other vehicles or objects, other driving events, and/or scores derived from a combination of these factors, such as an overall driving or safety score. The generated driver assessment values may be stored in database 204 in association with the corresponding driver.

DM computing device 210 may be configured to train the artificial intelligence model using sample data (e.g., pairs of sets of sample vehicle operation data and sets of sample driver assessment values that should result from the sample vehicle operation data), historical data, and/or some combination thereof. In some embodiments, the artificial intelligence model may be periodically or continuously retrained as new data (e.g., vehicle operation data and associated outcomes) becomes available. Alternatively, other supervised or unsupervised machine learning techniques may be used to train such a model.

In the exemplary embodiment, DM computing device 210 may be configured to determine a registered driver qualifies for a driving credential by comparing the at least one driver assessment value associated with the driver to at least one threshold corresponding to the driving credential. For example, the thresholds may specify a total time or distance that needs to be driven during driving instruction and/or certain minimum scores relating to driving safety and/or driving abilities (e.g., parking and/or driving in high-traffic areas). In some embodiments, the specific thresholds used to determine whether a particular driver qualify for the driving credential may depend on other information relating to the driver. For example, in some cases, the thresholds may depend on the age of the driver, in which a younger driver (e.g., a sixteen-year-old) may be subject to more stringent thresholds than an older driver (e.g., an eighteen-year-old). In another example, the thresholds may depend on a location where the driver lives and/or has practiced driving. For example, the thresholds may depend on a jurisdiction in which the driver lives, whether the driver lives in an urban, suburban, and/or rural area, and/or whether the driver lives in an area deemed to be safer or less safe for driving. In some embodiments, the thresholds may be based on a comparison to other drivers. For example, a driver may qualify if their driver assessment values are better than a certain predefined percentage of other drivers. In addition to driving credentials, these driver assessment values and thresholds may be used to determine if the driver qualifies for other driving rewards as described herein.

In the exemplary embodiment, DM computing device 210 may be configured to, in response to a determination that a driver has qualified for a driving credential, provide access to a digital document associated with the driving credential. For example, the driver may have user computer device 206 configured to execute a virtual wallet application. If the driver qualifies for a driving credential, DM computing device 210 may communicate with user computer device 206 to cause a digital document (e.g., a virtual driver license) to automatically be provided within the virtual wallet, thus enabling the driver to obtain instant proof of their driving credential. In some embodiment, the digital document being present in the virtual wallet may enable the driver to unlock or activate (e.g., using an NFC, Bluetooth, or other wireless connection) vehicles to which the driver has authorized access.

In some embodiments, DM computing device 210 may control access to the digital document, such as by locking or removing the digital document from the virtual wallet, based on an ongoing analysis of the driver's driving. For example, DM computing device 210 may continue to collect vehicle operation data after the driver has earned the driving credential to determine updated driver assessment values. If the updated driver assessment values fail to meet the required thresholds, DM computing device 210 may determine to, for example, temporarily suspend or revoke the driving credentials and/or impose certain restrictions (e.g., locations or times of day where the driver can drive unaccompanied) until the thresholds are met. In such cases, DM computing device 210 may automatically remove the digital document from the virtual wallet and/or modify the digital document to indicate that it has a locked or restricted status.

In some embodiments, DM computing device 210 may be further configured to determine a cost, such as a cost associated with obtaining the driving credential, based on the at least one driver assessment value. For example, different fee levels may be associated with obtaining the driving credential and/or the corresponding digital document, each with different associated thresholds, and DM computing device 210 may determine the fee based on which of these thresholds are met by the corresponding driver assessment values. Alternatively, the cost may be calculated as a function of the one or more driver assessment values. Other costs associated with vehicle 100 such as, for example, registration fees, personal property tax, insurance costs, emergency service costs, and/or other costs may be similarly determined or calculated based on the driver assessment values associated with the driver. In cases where these costs are recurring, updated driver assessment values based on new vehicle operation data may be used each time the cost is determined.

In some embodiments, DM computing device 210 may be further configured to generate, by applying the artificial intelligence model to the collected vehicle operation data stored in association with the first driver, at least one recommendation for improving driving skills. For example, DM computing device 210 may determine that, for a driver, a driver assessment value and/or score generated by the artificial intelligence model that is associated with parallel parking needs to be improved before the driver can qualify for driving credentials. DM computing device 210 may then generate a recommendation that the driver practice parallel parking. DM computing device 210 may similarly identify other areas of strength or areas of improvements, such as reducing speeding, leaving greater distance between vehicles, reducing distractions or usage of user computer device 206 during driving, checking mirrors or blind spots, or any other steps to driver safer and potentially qualify for driving credentials. The driver may then focus on these areas when practicing driving. Such recommendations may be displayed within a report provided by the DM to the user, for example, within a web page and/or app accessible through the driver's user computer device 206. The report may also include driver assessment values, vehicle operation data, charts, graphs, links to instructional videos, and/or other information that may assist the driver in reaching a driving proficiency necessary for obtaining a desired driver credential. In certain embodiments, the reports may also include data that enables a driver to compare their scores to others, such as average for other practicing drivers in the area or for drivers as a whole. Such recommendations and reports may also be generated after the driver has obtained the desired driver credential, so that the driver may continue with driving skill improvement and maintaining any earned driver credentials. In some embodiments, these recommendations and reports may be generated and updated in real time based on newly available data.

In some embodiments, DM computing device 210 may analyze groups of drivers, such as all the drivers trained by a particular driving instructor in order to assess and/or generate recommendations for the driving instructor. Such an analysis may be performed similarly to the analysis for an individual driver, with the artificial intelligence model instead using vehicle operation data associated with a group of drivers, such as those associated with the particular driving instructor. Based on this data, DM computing device 210 may generate driver instructor assessment values or scores, reports, and recommendations for improvement for the driving instructor. For example, if an instructor's students tend to struggle with parallel parking, DM computing device 210 may generate a recommendation that the driving instructor spend more time with each student practicing parallel parking. In some embodiments, this assessment o a driving instructor may be used, for example, to determine appropriate compensation for driving instructor services and/or made available to the public to assist in selection of a driving instructor.

Figure 3:
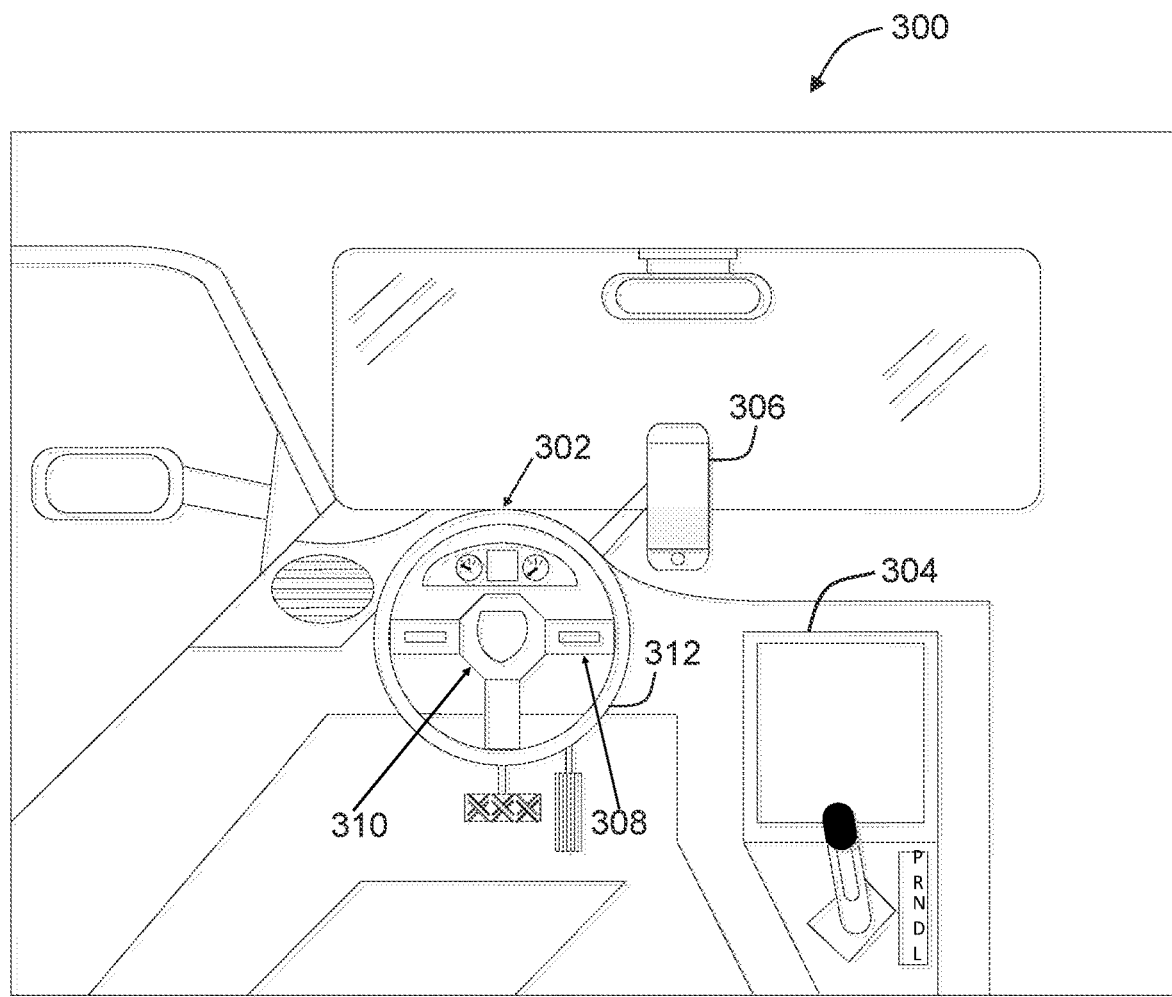

FIG. 3 depicts an example use case 300 for monitoring a driver 115 of vehicle 100 (both shown in FIG. 1) during a currently occurring trip (e.g., active trip) using system 200 (shown in FIG. 2) in accordance with one embodiment of the present disclosure. In particular, example use case 300 illustrates one version of using biometric sensors 105 (e.g., biometric input device) to detect driver 115 and to capture data of driver 115 in real-time.

As described above, vehicle 100 may include autonomous or semi-autonomous technology or functionality that include and/or are related to biometric identification. In the example embodiment, vehicle 100 includes a biometric steering wheel 302. Biometric steering wheel 302 includes biometric sensors 105 that may be positioned at various locations around the steering wheel of vehicle 100. Biometric steering wheel 302 is configured to detect the vehicle user as driver 115. In the example embodiment, a vehicle user places their hands on biometric steering wheel 302. In some embodiments, biometric sensors 105 may be embedded throughout a rim 312 of biometric steering wheel 302. In these embodiments, vehicle controller 110 may not only detect a vehicle user as driver 115, but also continuously monitor whether or not driver's 115 hands are on biometric steering wheel 302 during a trip. For example, vehicle controller 110 may monitor whether one hand or both hands are on biometric steering wheel 302 during an active trip. In this example, driving rewards (e.g., incentives) may be determined based on whether or not driver's 115 hands remain on biometric steering wheel 302 during a trip. Vehicle controller 110 may determine whether driver 115 is distracted by using biometric data received from biometric steering wheel 302. For example, during an active trip, vehicle controller 110 may detect that device 306 (similar to user computer device 206, as shown in FIG. 2 and/or mobile device 125, as shown in FIG. 1) has switched from an inactive state to an active state. In this example, vehicle controller 110 may confirm that driver 115 is on their device 306 (e.g., smartphone) based on detecting that only one hand is placed on biometric steering wheel 302. In other embodiments, biometric sensors 105 may be strategically positioned on the spoke 308 and/or central pad 310 of biometric steering wheel 302. In these embodiments, driver 115 may be prompted to provide biometric data at the start of the trip by pressing finger(s) or hand(s) against the spoke 308 and/or central pad 310. In other embodiments, driver 115 may be prompted to provide biometric data periodically throughout the currently occurring trip. Additionally or alternatively, depending on the placement of biometric sensors 105, vehicle controller 110 may prompt driver 115 to place their hand(s) on the dashboard (not shown) directly in front of driver 115. In further embodiments, vehicle 100 may be equipped with a biometric input device (e.g., biometric sensors 105) near the driver 115 separate from the steering wheel. In some embodiments, biometric sensors 105 may include one or more cameras and/or scanners that are configured to take biometric images of driver 115. For example, biometric sensors 105 may include, but are not limited to, a camera that captures facial images and/or a retinal scanner.

In the example embodiment, vehicle controller 110 may detect that a vehicle user is driver 115 by comparing the biometric data received for the active trip to the baseline biometric data stored in a database, such as database 204 (shown in FIG. 2). The baseline biometric data may include data for only authorized drivers of vehicle 100. In certain embodiments, vehicle 100 may have different types of biometric data, such as fingerprints, DNA, facial images, retinal images, and/or voice images. In these embodiments, vehicle controller 110 may conduct a multi-step verification process to identify the vehicle user as driver 115. For example, vehicle controller 110 may receive fingerprint data and a facial image of a user. In this example, vehicle controller 110 may compare both the fingerprint data and the facial image to the baseline biometric data to verify that that vehicle user is driver 115.

In the example embodiment vehicle controller 110 is also in communication with device 306 of driver 115. In the example embodiment, device 306 is inside vehicle 100. Before starting the trip, device 306 connects with vehicle 100 via any wired or wireless connection (e.g., Bluetooth®) over one or more radio links or wireless communication channels. Vehicle controller 110 may determine that a paired device 306 is associated with driver 115 because it is the only device 306 paired with vehicle 100. In some embodiments, vehicle controller 110 may utilize stored identification data (e.g., IMEI, MEID, ESN) of device 306 to verify that device 306 is associated with driver 115. In these embodiments, driver's 115 device 306 may be the only user computer device 206 registered with vehicle 100. In other embodiments, driver 115 may have previously registered device 306 with an insurance provider of the automobile insurance policy for vehicle 100. In these embodiments, vehicle controller 110 may be in communication with the insurance provider via an insurer network, such as insurer network 212 to access information associated with driver's 115 device 306. For example, after detecting, from received biometric data, that a vehicle user is driver 115, vehicle controller 110 may receive, from insurer network 212, identification data of device 306. In this example, vehicle controller 110 may compare the received data to information of a paired device 306 to determine whether device 306 is associated with driver 115.

In further embodiments, vehicle 100 may be in communication with one or more devices 306 that are each associated with one of users of vehicle 100. In one embodiment, at the beginning and/or at the end of a trip, the application on device 306 may prompt selection of which vehicle user is/was driver 115 of the trip, and vehicle controller 110 may record the selected driver 115 as driver 115 for the trip, such that telematics data associated with that trip may be attributed to the correct driver 115. This method may be employed as a validation or verification in addition to receiving biometric data of a vehicle user, as disclosed above. For example, after a trip in which driver 115 is determined using biometric sensors 105, the application on device 306 may prompt confirmation that driver 115 was, in fact, (i) driver 115 of the trip and (ii) associated with the paired device 306 (e.g., vehicle 100 paired with driver's 115 device 306). Vehicle controller 110 may receive an indication of a positive or negative response to the prompt, and confirm records for the trip. In still other embodiments, vehicle controller 110 may use additional vehicle telematics data in addition to using the received biometric data, such as sensor information from sensors 105 within a paired device 306, to determine which vehicle user is the driver 115 when multiple devices 306 pair with vehicle 100 during a single trip.

Vehicle 100 also includes a user interface 304 that enables driver 115 to communicate with vehicle 100. In some embodiments, vehicle 100 includes an infotainment system, which enables driver 115 to engage with applications and functions such as maps, real-time navigation (e.g., GPS), and music through vehicle 100 rather than through device 306. In further embodiments, user interface 304 may display applications from driver's 115 device 306 after connecting with driver's 115 device 306. For example, prior to the trip, driver 115 may select applications, such as audiobooks from device 306 to be in communication with vehicle controller 110. In this example, driver 115 may access the selected applications via user interface 304 rather than directly through device 306 (e.g., by unlocking their phone and accessing each application on the phone).

In the example embodiment, upon connecting with device 306, vehicle controller 110 may automatically activate (e.g., launch) an application that switches device 306 into an inactive mode. For example, the application may turn on a "do not disturb" or driving mode setting on device 306 without driver 115 having to manually select the desired setting on device 306. In other embodiments, vehicle controller 110 may detect that device 306 is in child mode. Child mode may be a setting or applications offered by device 306 that restricts usage to parent-approved content. In these embodiments, based on the selected setting (e.g., child mode), vehicle controller 110 may determine that someone other than driver 115 is using device 306 in vehicle 100 while driver 115 is driving during the trip. In some embodiments, vehicle controller 110 may confirm that driver 115 is not using device 306 because vehicle controller 110 is continuously receiving biometric data from driver 115 via biometric steering wheel 302.

FIG. 4 illustrates a flow chart of an example method 400 of monitoring driving behavior of driver 115 in real-time. Method 400 may be implemented by a computing device, such as driver monitoring (DM) computing device 210 (shown in FIG. 2). In the example embodiment, DM computing device 210 may be in communication with user computer device 206 (shown in FIG. 2), vehicle controller 110, mobile device 125 (both shown in FIG. 1), and device 306 (shown in FIG. 3). DM computing device 210 may also be in communication with sensors 105 such as biometric sensors 105 (shown in FIG. 1) and insurer network 212 (shown in FIG. 2).

In the example embodiment, method 400 includes detecting 402 a user computer device associated with a driver inside a vehicle. Method 400 also includes collecting 404 state data of the user computer device, the state data including data as to a state of the user computer device during a currently occurring trip, the state being at least one of an inactive state and an active state. The inactive state may include user computer device 206 being in a child mode (e.g., kid friendly parent-approved applications), hands-free mode (e.g., talking on a phone through vehicle 100's sound system), and/or locked mode (e.g., user computer device 206 such as a phone requires input such as passcode, motion, and/or biometric data from driver 115 to open). In the example embodiment, DM computing device 210 is configured to track the state of user computer device 206 in real-time throughout the duration of the currently occurring trip. DM computing device 210 may record, for example, the overall duration and distance for which user computer device 206 is in the inactive state relative to the active state for the currently occurring trip. Method 400 further includes collecting 406 vehicle operation data of the vehicle while the driver and the user computer device are inside the vehicle, the vehicle operation data including vehicle telematics data. Method 400 also includes comparing 408, by DM computing device 210, the collected vehicle operation data and the collected state data of the user computer device to determine whether the user computer device was activated during the currently occurring trip. Method 400 further includes causing 410 a driving reward to be applied to an account associated with the driver for inactivity of the user computer device during the currently occurring trip, wherein the inactivity is based on the inactive state.

Figure 5:
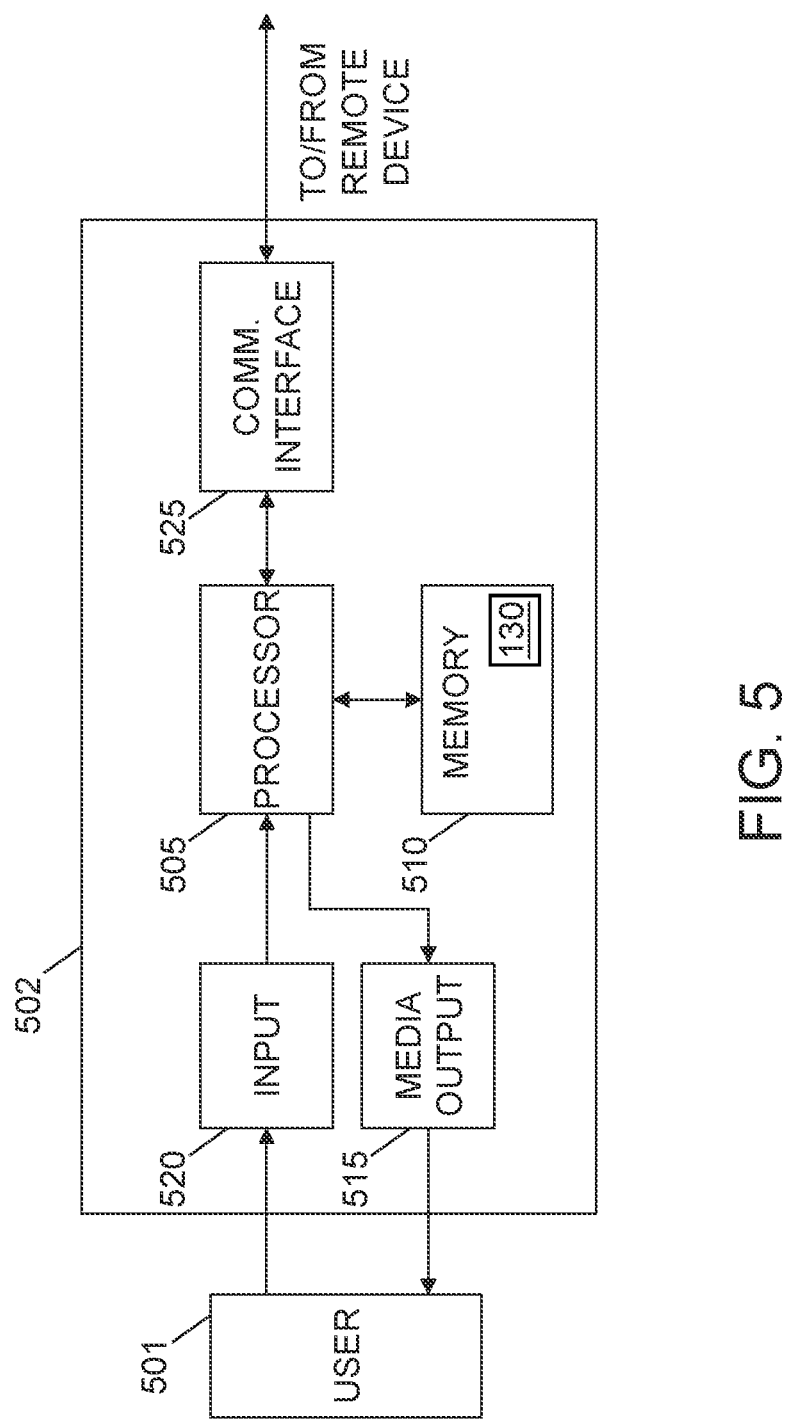

FIG. 5 depicts an example configuration of user computer device 206 shown in FIG. 2, in accordance with one embodiment of the present disclosure. User computer device 502 may be operated by a user 501. User computer device 502 may include, but is not limited to, user computer devices 206, DM computer device 210 (both shown in FIG. 2), device 306 (shown in FIG. 3), mobile device 125, and vehicle controller 110 (both shown in FIG. 1). User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media. In the example embodiment, memory area 510 includes DM module 130, which is remote from a backend server, such as DM computing device 210. DM module 130 can be a plug-in to vehicle controller 110 (shown in FIG. 1), a separate component or module, and/or a software application.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an online store interface for viewing and/or purchasing items, and/or a wallet application for managing payment information. In some embodiments, user computer device 502 may include an input device 520 for receiving input from user 501. User 501 may use input device 520 to, without limitation, input a username and password to access their insurance policy and/or to access information about trip(s) and corresponding rewards.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote-computing device such as insurer network 212 (shown in FIG. 2). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from a remote-computing device. A client application may allow user 501 to interact with, for example, DM computing device 210 and/or insurer network 212 (both shown in FIG. 2). For example, instructions may be stored by a cloud service, and the output of the execution of the instructions sent to the media output component 515.

Figure 6:
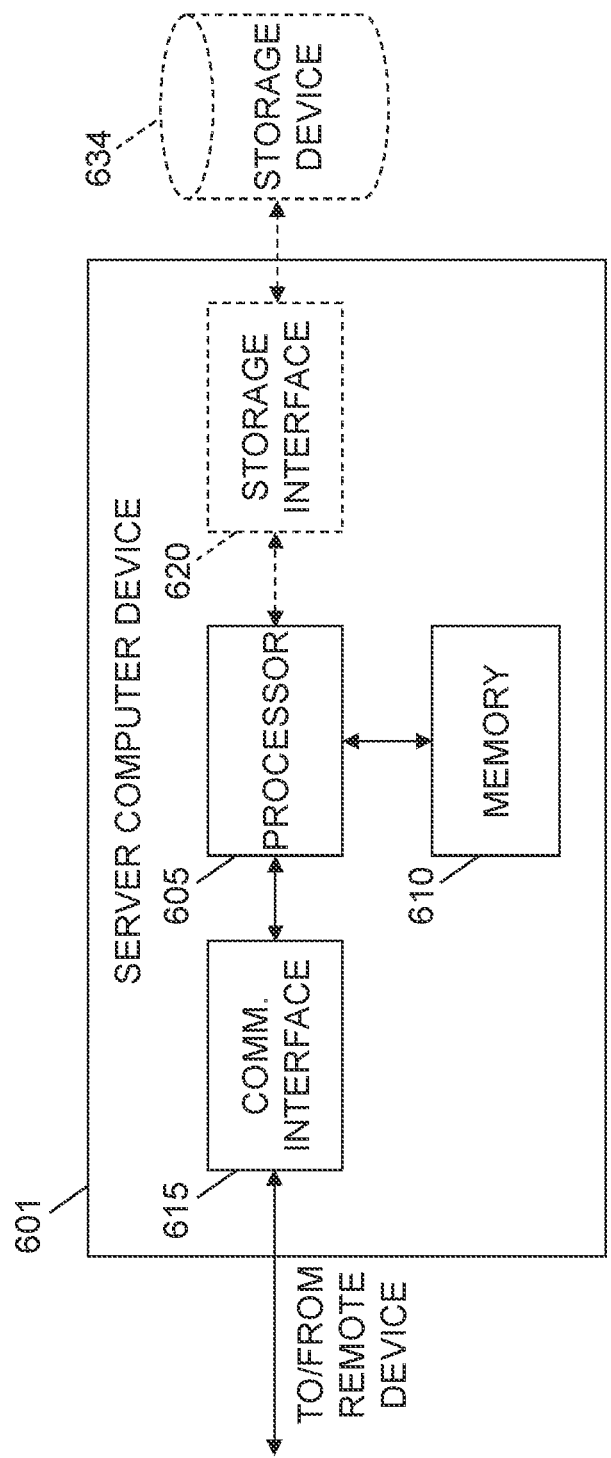

FIG. 6 depicts an example configuration of server 202 shown in FIG. 2, in accordance with one embodiment of the present disclosure. Server computer device 601 may include, but is not limited to, insurer network 212, DM computing device 210, and database server 202 (all shown in FIG. 2). In the example embodiment, server 202 is DM computing device 210. Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, insurer network 212 vehicle controller 110, mobile device 125 (both shown in FIG. 1), device 306 (shown in FIG. 3) DM computing device 210, and user computer devices 206 (shown in FIG. 2), for example, by using wireless communication or data transmission over one or more radio links or digital communication channels. For example, communication interface 615 may receive requests from user computer devices 206 via the Internet, as illustrated in FIG. 2.

Processor 605 may also be operatively coupled to a storage device 634. Storage device 634 may be any computer-operated hardware suitable for storing and/or retrieving data, such as, but not limited to, data associated with database 204 (shown in FIG. 2). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with instructions, such as those illustrated in FIG. 4.

Figure 7:
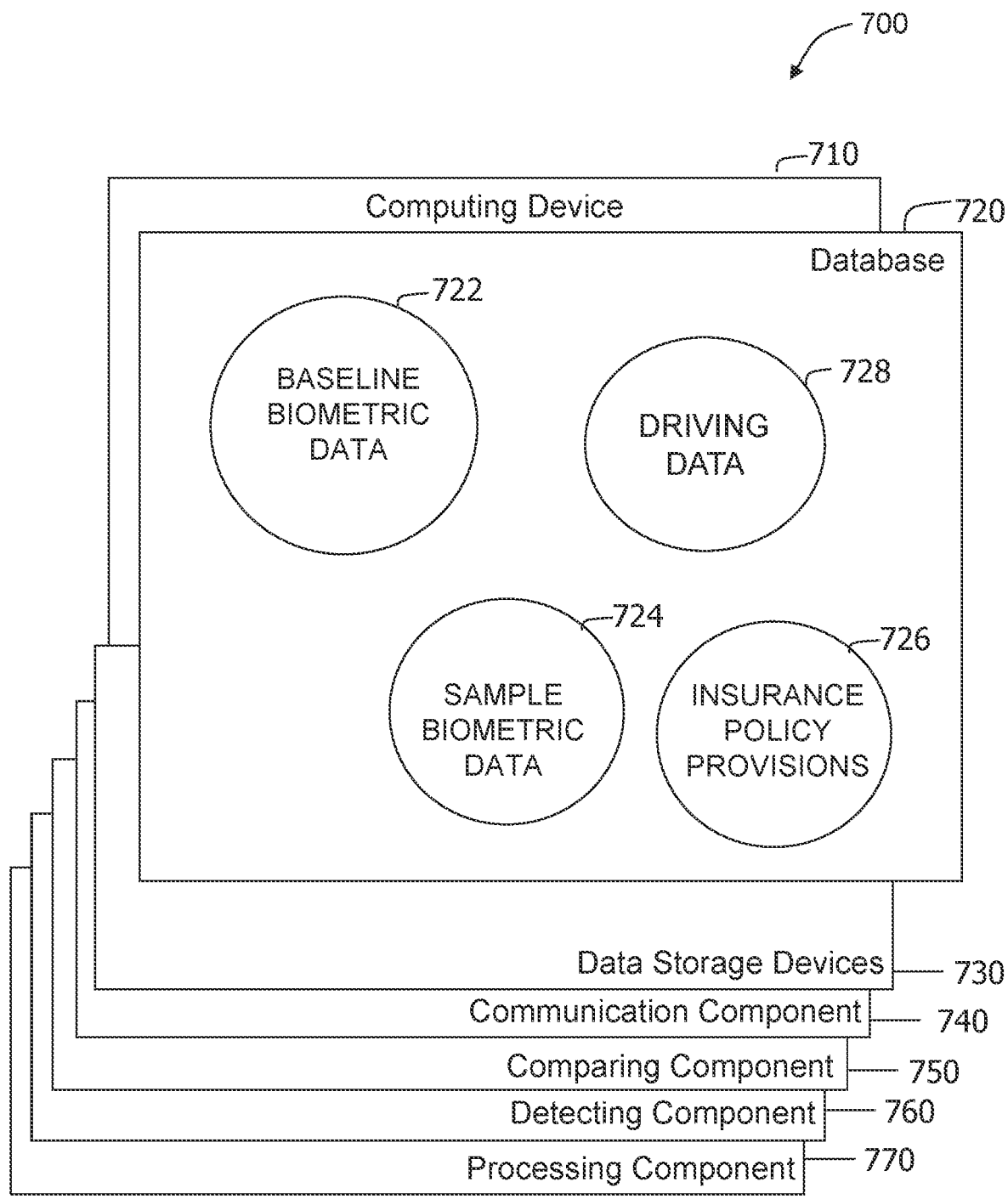

FIG. 7 depicts a diagram 700 of components of one or more example computing devices 710 that may be used in system 200 shown in FIG. 2. In some embodiments, computing device 710 may be similar to DM computing device 210 (shown in FIG. 2). Database 720 may be coupled with several separate components within computing device 710, which perform specific tasks. In this embodiment, database 720 may include baseline biometric data 722 for authorized drivers, sample biometric data 724 received from vehicle users of vehicle 100, insurance policy provisions 726 associated with vehicle 100 and/or driver 115, driving data 728 associated with an active trip and/or past trip(s). In some embodiments, database 720 may include sensor data, reports concerning the state of user computer device 206 during a trip, and calculations as to rewards earned by driver 115 for driving with user computer device 206 in an inactive state. In some embodiments, database 720 is similar to database 204 (shown in FIG. 2).

Computing device 710 may include the database 720, as well as data storage devices 730. Computing device 710 may also include a communication component 740 for collecting 404 state data of user computer device 206 and for collecting 406 vehicle operation data of vehicle 100 while driver 115 and user computer device 206 are inside vehicle 100 (shown in FIG. 4). Computing device 710 may further include a comparing component 750 for comparing 408 the collected vehicle operation data and the collected state data to determine whether user computer device 206 was activated (shown in FIG. 4). Computing device 710 may also include a detecting component 760 for detecting 402 user computer device 206 associated with driver 115 inside vehicle 100 (shown in FIG. 4). Computing device 710 may also include a processing component 770 for causing 410 a driving reward to be applied to an account associated with driver 115 for inactivity of user computer device 206 (shown in FIG. 4). Processing component 770 may further assist with execution of computer-executable instructions associated with the system.

FIGS. 8A and 8B illustrate a flow chart of an example method 800 of monitoring driving behavior of driver 115. Method 400 may be implemented by a computing device, such as driver monitoring (DM) computing device 210 (shown in FIG. 2). In the example embodiment, DM computing device 210 may be in communication with user computer device 206 (shown in FIG. 2), vehicle controller 110, mobile device 125 (both shown in FIG. 1), and device 306 (shown in FIG. 3). DM computing device 210 may also be in communication with sensors 105 such as biometric sensors 105 (shown in FIG. 1) and insurer network 212 (shown in FIG. 2).

In the exemplary embodiment, method 800 may include storing 802, in a database, baseline biometric information for a plurality of registered drivers. In certain embodiments, storing 802 may be performed by DM computing device 210 (shown in FIG. 2).

In the exemplary embodiment, method 800 may further include collecting 804 biometric data generated by one or more biometric sensors of the vehicle. In certain embodiments, collecting 804 may be performed by DM computing device 210 (shown in FIG. 2).

In the exemplary embodiment, method 800 may further include comparing 806 the collected biometric data to the baseline biometric information to identify a first driver of the plurality of registered drivers that is present in a vehicle. In some embodiments, the biometric data is generated by one or more of a face identification camera or a fingerprint reader installed in the vehicle. In certain embodiments, comparing 806 may be performed by DM computing device 210 (shown in FIG. 2).

In the exemplary embodiment, method 800 may further include collecting 808 vehicle operation data of the vehicle while the first driver is in the vehicle. In some embodiments, the vehicle operation data is generated by one or more of a speedometer, exterior radar, exterior cameras, interior cameras, or turn signals of the vehicle. In certain embodiments, collecting 808 may be performed by DM computing device 210 (shown in FIG. 2).

In the exemplary embodiment, method 810 may further include storing 808 the collected vehicle operation data in association with the first driver in the database. In certain embodiments, storing 810 may be performed by DM computing device 210 (shown in FIG. 2).

In the exemplary embodiment, method 800 may further include generating 812, by applying an artificial intelligence model to the collected vehicle operation data stored in association with the first driver, at least one driver assessment value. In certain embodiments, generating 812 may be performed by DM computing device 210 (shown in FIG. 2).

In some embodiments, method 800 may further include generating 814, by applying the artificial intelligence model to the collected vehicle operation data stored in association with the first driver, at least one recommendation for improving driving skills. In some such embodiments, method 800 may further include causing 816 the user device associated with the first driver to display the at least one recommendation. In certain embodiments, generating 814 and causing 816 may be performed by DM computing device 210 (shown in FIG. 2).

In the exemplary embodiment, method 800 may further include determining 818 the first driver qualifies for a driving credential by comparing the at least one driver assessment value to at least one threshold. In certain embodiments, determining 818 may be performed by DM computing device 210 (shown in FIG. 2).

In the exemplary embodiment, method 800 may further include, in response to the determination, providing 820 access to a digital document within a virtual wallet application executed by the user device associated with the first driver, the digital document associated with the driving credential. In certain embodiments, providing 820 may be performed by DM computing device 210 (shown in FIG. 2).

In some embodiments, method 800 may further include determining 822 a cost associated with obtaining the driving credential based on the at least one driver assessment value. In certain embodiments, determining 822 may be performed by DM computing device 210 (shown in FIG. 2).

In some embodiments, method 800 may further include receiving 824 subsequent vehicle operation data associated with the first driver after providing access to the digital document. In certain embodiments, receiving 824 may be performed by DM computing device 210 (shown in FIG. 2).

In such embodiments, method 800 may further include generating 826, by applying the artificial intelligence model to the subsequent vehicle operation data associated with the first driver, an updated at least one driver assessment value. In certain embodiments, generating 826 may be performed by DM computing device 210 (shown in FIG. 2).

In such embodiments, method 800 may further include determining 828 the first driver qualifies to maintain the driving credential by comparing the updated at least one driver assessment value to at least one threshold. In certain embodiments, determining 828 may be performed by DM computing device 210 (shown in FIG. 2).

In such embodiments, method 800 may further include controlling 830 access to the digital document based on the determination. In certain embodiments, controlling 830 may be performed by DM computing device 210 (shown in FIG. 2).

In the systems and methods described herein, a processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based on example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may based on the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based on these analyses, the processing element may learn how to identify characteristics and patterns that may then be applied to training models, analyzing transaction and authentication data, and detecting and analyzing risk.

In addition, although various elements of the computer system are described herein as including general processing and memory devices, it should be understood that the computer system is a specialized computer configured to perform the steps described herein for facilitating real time communication across different networks to update user computing devices to display user spending limits.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A driver monitoring (DM) computing device for monitoring driving behavior, the DM computing device comprising a processor in communication with a memory and a vehicle, the processor configured to:
   store, in a database, baseline biometric information for a plurality of registered drivers;
   collect biometric data generated by one or more biometric sensors of the vehicle;
   compare the collected biometric data to the baseline biometric information to identify a first driver of the plurality of registered drivers that is present in a vehicle;
   continually collect vehicle operation data of the vehicle while the first driver is in the vehicle;
   continually store the collected vehicle operation data in association with the first driver in the database;
   continually generate, by inputting the collected vehicle operation data stored in association with the first driver into an artificial intelligence model, at least one real-time driver assessment value, the artificial intelligence model trained based on historical vehicle operation data and one or more sample driver assessment values;
   continually update the at least one real-time driver assessment value by inputting further vehicle operation data into the artificial intelligence model as the further vehicle operation data of the vehicle is stored in association with the first driver;
   continually compare the updated at least one real-time driver assessment value to determine the first driver currently qualifies for a driving credential;
   to when the first driver currently qualifies for the first driving credential, enable a digital document to be presented within a virtual wallet application executed by a user device associated with the first driver, the digital document associated with the driving credential; and
   when the first driver does not currently qualify for the first driving credential, disable the digital document from being presented within the virtual wallet application.

2. The DM computing device of claim 1, wherein the processor is further configured to generate, by applying the artificial intelligence model to the collected vehicle operation data stored in association with the first driver, at least one recommendation for improving driving skills.

3. The DM computing device of claim 2, wherein the processor is further configured to cause the user device associated with the first driver to display the at least one recommendation.

4. The DM computing device of claim 1, wherein the processor is further configured to determine a cost associated with obtaining the driving credential based on the at least one driver assessment value.

5. The DM computing device of claim 1, wherein the biometric data is generated by one or more of a face identification camera or a fingerprint reader installed in the vehicle.

6. The DM computing device of claim 1, wherein the vehicle operation data is generated by one or more of a speedometer, exterior radar, exterior cameras, interior cameras, or turn signals of the vehicle.

7. A computer-implemented method for monitoring driving behavior, the computer-implemented method performed by a driver monitoring (DM) computing device including a processor in communication with a memory and a vehicle, the computer-implemented method comprising:
   storing, in a database, baseline biometric information for a plurality of registered drivers;
   collecting biometric data generated by one or more biometric sensors of the vehicle;
   comparing the collected biometric data to the baseline biometric information to identify a first driver of the plurality of registered drivers that is present in a vehicle;
   continually collecting vehicle operation data of the vehicle while the first driver is in the vehicle;
   continually storing the collected vehicle operation data in association with the first driver in the database;
   continually generating, inputting the collected vehicle operation data stored in association with the first driver into an artificial intelligence model, at least one real-time driver assessment value, the artificial intelligence model trained based on historical vehicle operation data and one or more sample driver assessment values;
   continually updating the at least one real-time driver assessment value by inputting further vehicle operation data into the artificial intelligence model as the further vehicle operation data of the vehicle is stored in association with the first driver;

continually comparing the updated at least one real-time driver assessment value to determine the first driver currently qualifies for a driving credential;

when the first driver currently qualifies for the first driving credential, enabling a digital document to be presented within a virtual wallet application executed by a user device associated with the first driver, the digital document associated with the driving credential; and when the first driver does not currently qualify for the first driving credential, disabling the digital document from being presented within the virtual wallet application.

8. The computer-implemented method of claim 7, further comprising generating, by applying the artificial intelligence model to the collected vehicle operation data stored in association with the first driver, at least one recommendation for improving driving skills.

9. The computer-implemented method of claim 8, further comprising causing the user device associated with the first driver to display the at least one recommendation.

10. The computer-implemented method of claim 7, further comprising determining a cost associated with obtaining the driving credential based on the at least one driver assessment value.

11. The computer-implemented method of claim 7, wherein the biometric data is generated by one or more of a face identification camera or a fingerprint reader installed in the vehicle.

12. The computer-implemented method of claim 7, wherein the vehicle operation data is generated by one or more of a speedometer, exterior radar, exterior cameras, interior cameras, or turn signals of the vehicle.

13. At least one non-transitory computer-readable media having computer-executable instructions embodied thereon, wherein when executed by a driver monitoring (DM) computing device including at least one processor in communication with a memory and a vehicle, the computer-executable instructions cause the at least one processor to:

store, in a database, baseline biometric information for a plurality of registered drivers;

collect biometric data generated by one or more biometric sensors of the vehicle;

compare the collected biometric data to the baseline biometric information to identify a first driver of the plurality of registered drivers that is present in a vehicle;

continually collect vehicle operation data of the vehicle while the first driver is in the vehicle;

continually store the collected vehicle operation data in association with the first driver in the database;

continually generate, by inputting the collected vehicle operation data stored in association with the first driver into an artificial intelligence model, at least one real-time driver assessment value, the artificial intelligence model trained based on historical vehicle operation data and one or more sample driver assessment values;

continually updating the at least one real-time driver assessment value by inputting further vehicle operation data into the artificial intelligence model as the further vehicle operation data of the vehicle is stored in association with the first driver;

continually compare the updated at least one real-time driver assessment value to determine the first driver currently qualifies for a driving credential;

when the first driver currently qualifies for the first driving credential, enable a digital document to be presented within a virtual wallet application executed by a user device associated with the first driver, the digital document associated with the driving credential; and when the first driver does not currently qualify for the first driving credential, disable the digital document from being presented within the virtual wallet application.

14. The at least one non-transitory computer-readable media of claim 13, wherein the computer-executable instructions further cause the at least one processor to generate, by applying the artificial intelligence model to the collected vehicle operation data stored in association with the first driver, at least one recommendation for improving driving skills.

15. The at least one non-transitory computer-readable media of claim 14, wherein the computer-executable instructions further cause the at least one processor to cause the user device associated with the first driver to display the at least one recommendation.

16. The at least one non-transitory computer-readable media of claim 13, wherein the computer-executable instructions further cause the at least one processor to determine a cost associated with obtaining the driving credential based on the at least one driver assessment value.

17. The at least one non-transitory computer-readable media of claim 13, wherein the biometric data is generated by one or more of a face identification camera or a fingerprint reader installed in the vehicle.

18. The DM computing device of claim 1, wherein the processor is further configured to train the artificial intelligence model using the historical vehicle operation data and the one or more sample driver assessment values.

19. The DM computing device of claim 18, wherein the historical vehicle operation data and the one or more sample driver assessment values are organized as pairs of correlated data, each of the pairs of correlated data including (i) a set of historical vehicle operation data and (ii) a sample driver assessment value.

20. The DM computing device of claim 18, wherein the processor is further configured to update the artificial intelligence model based on the collected vehicle operation data.

* * * * *